United States Patent
Jung et al.

(10) Patent No.: US 11,146,724 B2
(45) Date of Patent: Oct. 12, 2021

(54) METHOD AND SYSTEM FOR PROVIDING RECOMMENDATION INFORMATION RELATED TO PHOTOGRAPHY

(71) Applicant: Samsung Electronics Co., Ltd., Suwon-si (KR)

(72) Inventors: Jae-ho Jung, Yongin-si (KR); Yeul-tak Sung, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/161,761

(22) Filed: Oct. 16, 2018

(65) Prior Publication Data
US 2019/0174056 A1   Jun. 6, 2019

(30) Foreign Application Priority Data
Dec. 1, 2017   (KR) .................. 10-2017-0164328

(51) Int. Cl.
*H04N 5/232*   (2006.01)
*H04N 5/235*   (2006.01)
(Continued)

(52) U.S. Cl.
CPC ..... *H04N 5/23222* (2013.01); *H04N 1/00244* (2013.01); *H04N 5/2258* (2013.01);
(Continued)

(58) Field of Classification Search
CPC .......... H04N 5/23222; H04N 5/23218; H04N 5/2351; H04N 5/232939; H04N 5/2258;
(Continued)

(56) References Cited

U.S. PATENT DOCUMENTS

| | | | |
|---|---|---|---|
| 7,924,340 B2* | 4/2011 | Kato | G06K 9/00255 348/333.01 |
| 8,200,019 B2 | 6/2012 | Zhang et al. | |

(Continued)

FOREIGN PATENT DOCUMENTS

| | | |
|---|---|---|
| CN | 104301613 A | 1/2015 |
| CN | 104717413 | 6/2015 |

(Continued)

OTHER PUBLICATIONS

International Search Report dated Jan. 14, 2019, issued in International Application No. PCT/KR2018/011670.

(Continued)

*Primary Examiner* — Padma Haliyur
(74) *Attorney, Agent, or Firm* — Jefferson IP Law, LLP

(57) ABSTRACT

An electronic apparatus and a method by which the electronic apparatus provides recommendation information related to photography are provided. The method includes identifying a subject included in a preview image recognized by a first camera, obtaining information of the identified subject, obtaining information related to light in surroundings of the identified subject, determining a recommended photographing composition based on the information of the identified subject and the information related to the light in the surroundings of the subject, and providing information about the determined recommended photographing composition.

16 Claims, 32 Drawing Sheets

(51) Int. Cl.
*H04N 5/225* (2006.01)
*H04N 1/00* (2006.01)

(52) U.S. Cl.
CPC ....... *H04N 5/2351* (2013.01); *H04N 5/23218* (2018.08); *H04N 5/232939* (2018.08); *H04N 2201/0084* (2013.01)

(58) Field of Classification Search
CPC ....... H04N 1/00244; H04N 2201/0084; H04N 5/232935; H04N 5/232945; G06N 3/0445; G06N 3/088; G06N 3/084
See application file for complete search history.

(56) References Cited

U.S. PATENT DOCUMENTS

| | | | | |
|---|---|---|---|---|
| 8,786,754 | B2* | 7/2014 | Narita | H04N 5/23219 348/333.12 |
| 9,225,947 | B2 | 12/2015 | Lee et al. | |
| 9,407,815 | B2* | 8/2016 | Bostick | G06F 16/29 |
| 10,291,833 | B2* | 5/2019 | Kim | H04N 5/2258 |
| 10,623,661 | B2* | 4/2020 | Oh | H04N 5/23232 |
| 2009/0162042 | A1 | 6/2009 | Wexler et al. | |
| 2009/0202157 | A1 | 8/2009 | Zhang et al. | |
| 2010/0110266 | A1 | 5/2010 | Lee et al. | |
| 2010/0245610 | A1* | 9/2010 | Ahn | H04N 5/23219 348/222.1 |
| 2010/0329552 | A1 | 12/2010 | Yim et al. | |
| 2013/0155293 | A1 | 6/2013 | Lee et al. | |
| 2013/0293579 | A1 | 11/2013 | Wu et al. | |
| 2015/0178592 | A1* | 6/2015 | Ratcliff | H04N 5/23222 382/155 |
| 2015/0264267 | A1 | 9/2015 | Park et al. | |
| 2016/0028949 | A1* | 1/2016 | Lee | H04N 5/23232 348/218.1 |
| 2016/0284095 | A1 | 9/2016 | Chalom et al. | |
| 2016/0286132 | A1 | 9/2016 | Kim et al. | |
| 2017/0208244 | A1 | 7/2017 | Ann et al. | |
| 2018/0048826 | A1* | 2/2018 | Lee | H04N 5/23212 |

FOREIGN PATENT DOCUMENTS

| | | |
|---|---|---|
| CN | 107257438 A | 10/2017 |
| KR | 10-2009-0087670 A | 8/2009 |
| KR | 10-2013-0069123 A | 6/2013 |
| KR | 10-2015-0134960 A | 2/2015 |
| KR | 10-2015-0106719 A | 9/2015 |
| KR | 10-1630299 B1 | 6/2016 |
| WO | 2017/069670 | 4/2017 |

OTHER PUBLICATIONS

First European Examination Report dated Apr. 16, 2020, issued in European Patent Application No. 18882342.1-1209.
Extended European Search Report dated Apr. 20, 2020, issued in European Patent Application No. 19213664.6-1209.
Extended European Search Report dated Nov. 15, 2019, issued in European Patent Application No. 18882342.1-1209.
Chinese Office Action dated Jan. 18, 2021, issued in Chinese Patent Application No. 201880019872.9.
Extended European Search Report dated Feb. 5, 2021, issued in European Patent Application No. 21150571.4-1209.
Chinese Office Action dated May 17, 2021, issued in Chinese Patent Application No. 201880019872.9.

* cited by examiner

FIG. 5
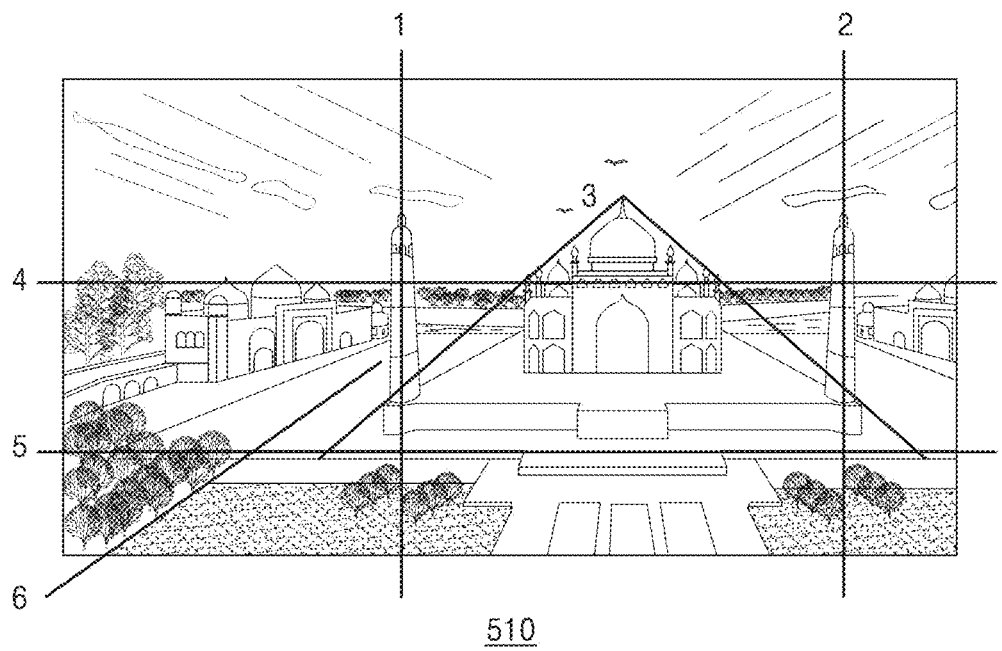
510
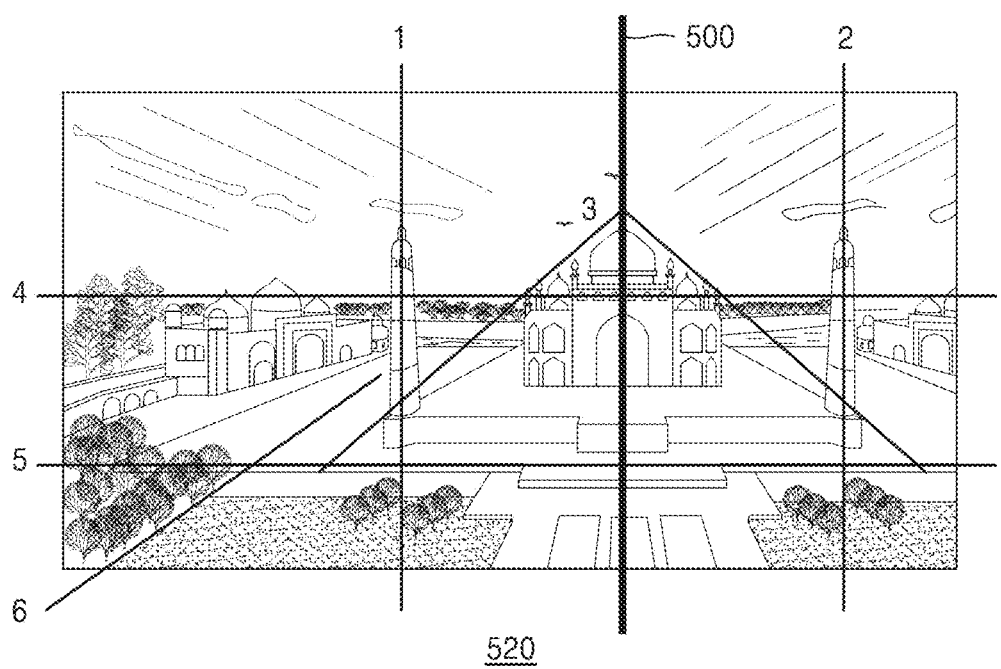
520

FIG. 8

FIG. 10
FIRST CAMERA(1001) + SECOND CAMERA(1002)
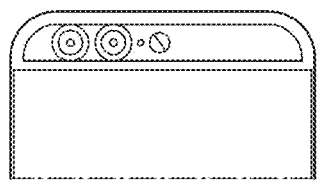
1010      GENERAL + TELEPHOTO
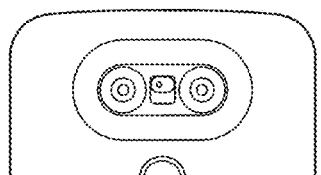
1020      GENERAL + WIDE − ANGLE
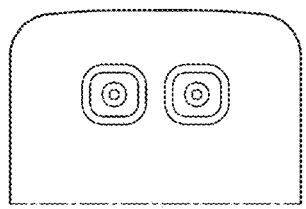
1030      GENERAL + GENERAL FIG. 12
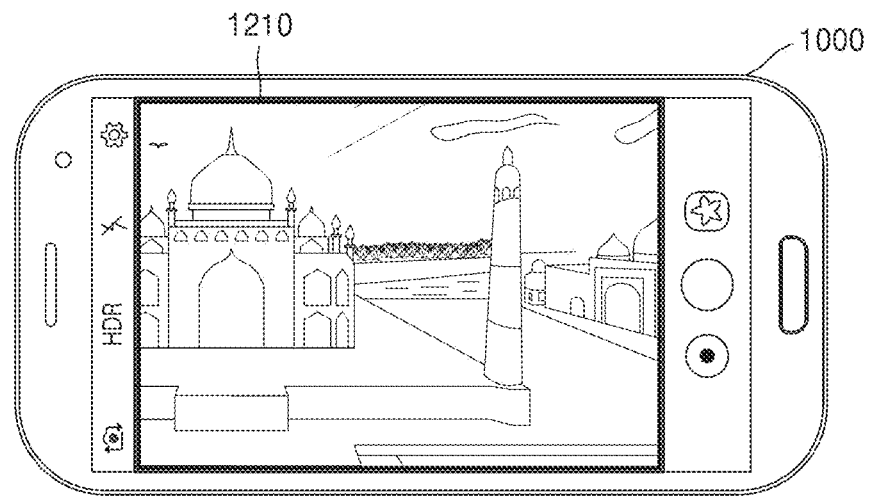
1200-1
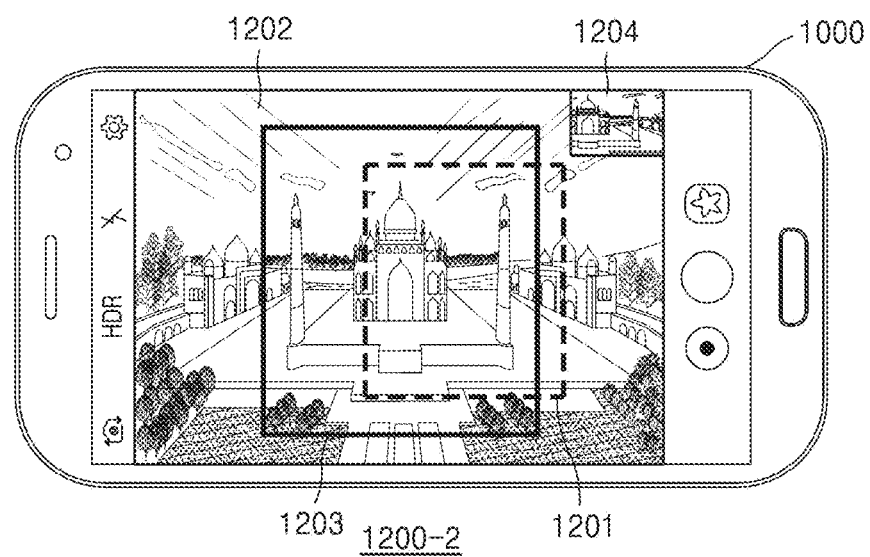
1200-2

FIG. 13
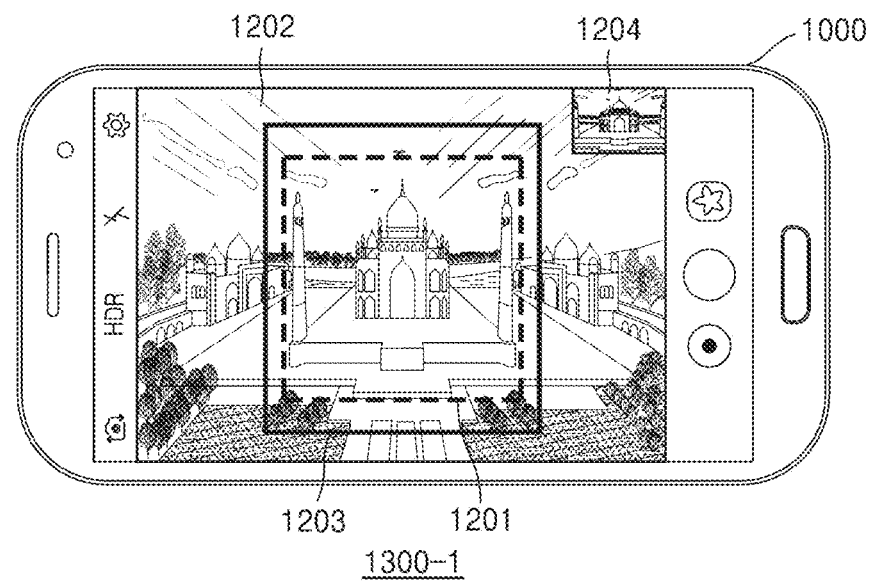
1300-1
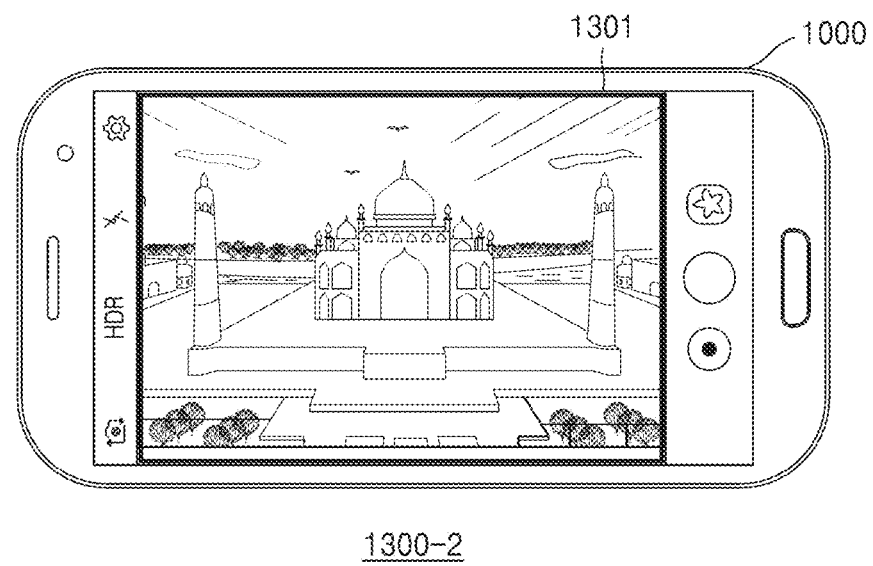
1300-2

FIG. 15
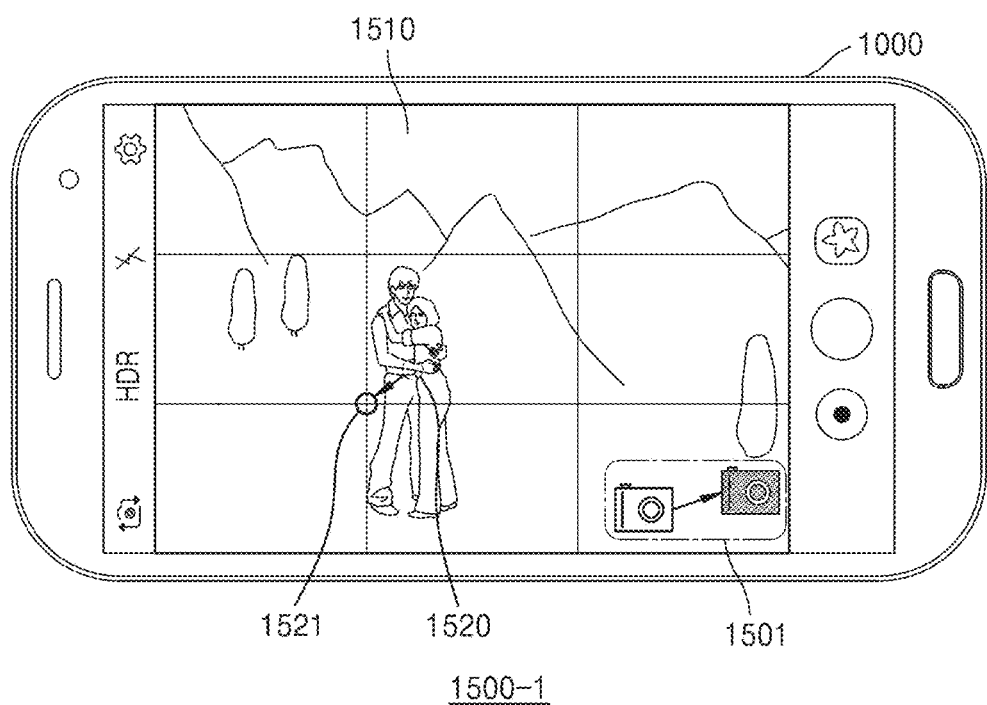
1500-1
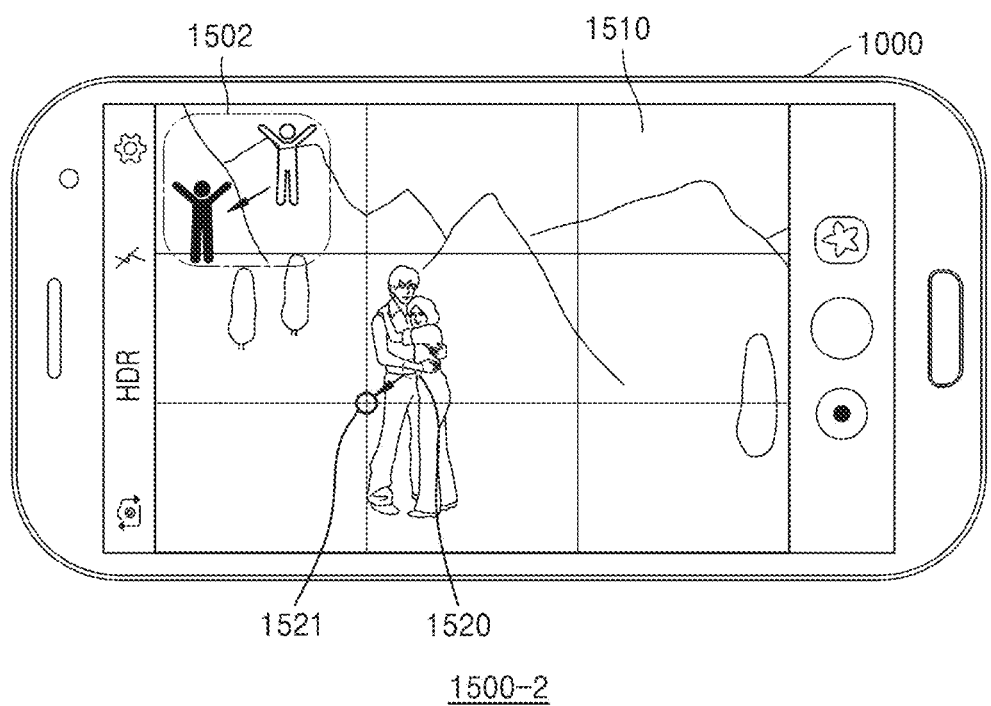
1500-2

FIG. 17
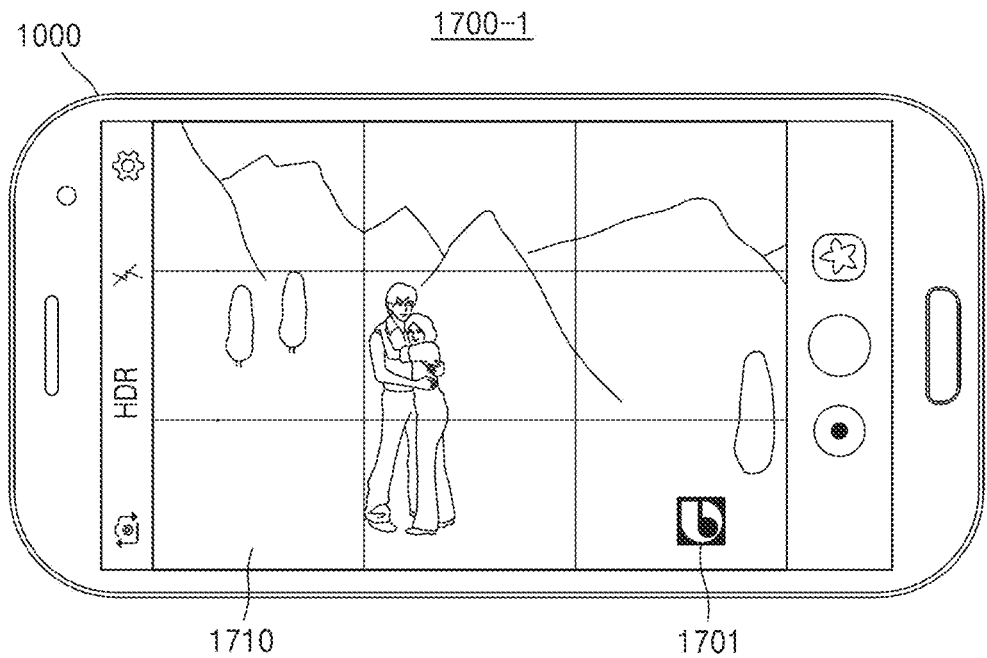
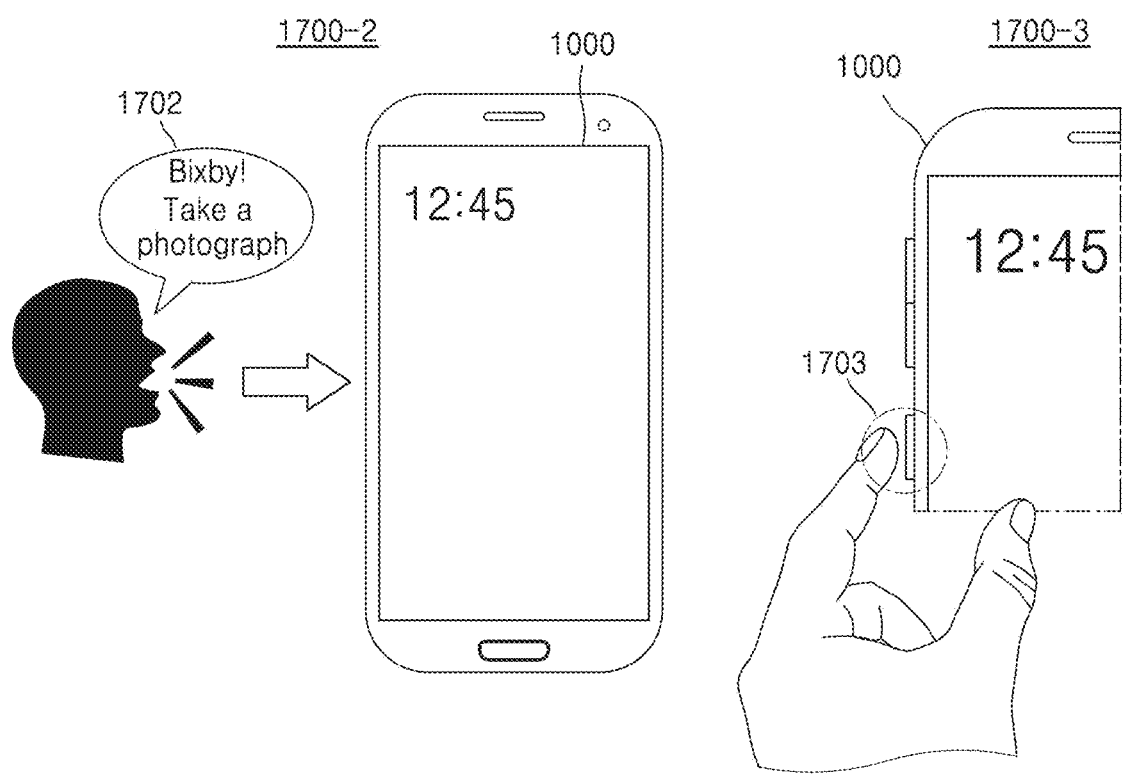

FIG. 20
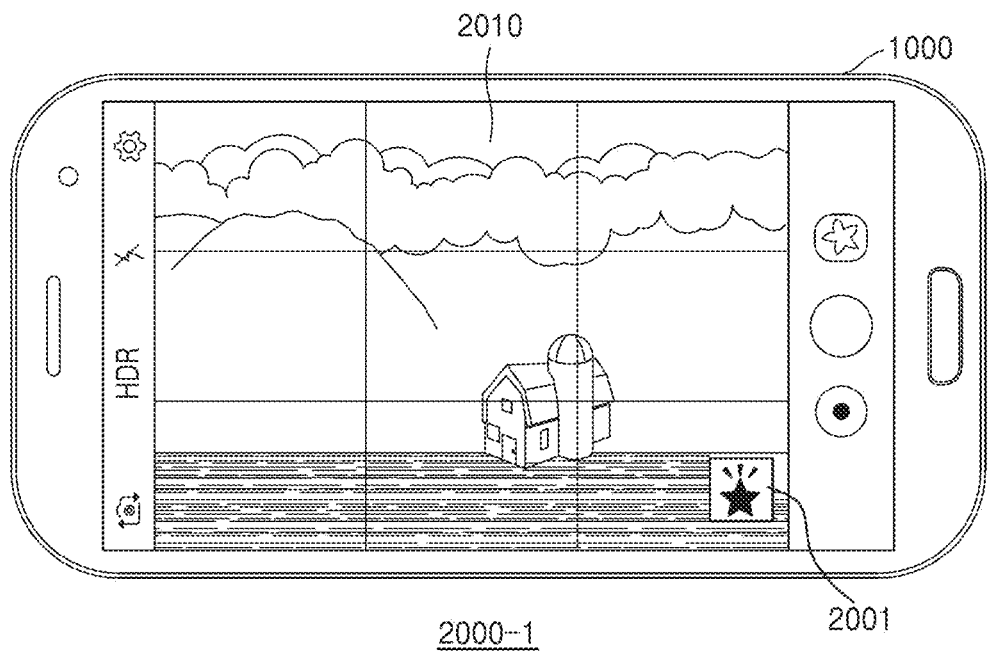
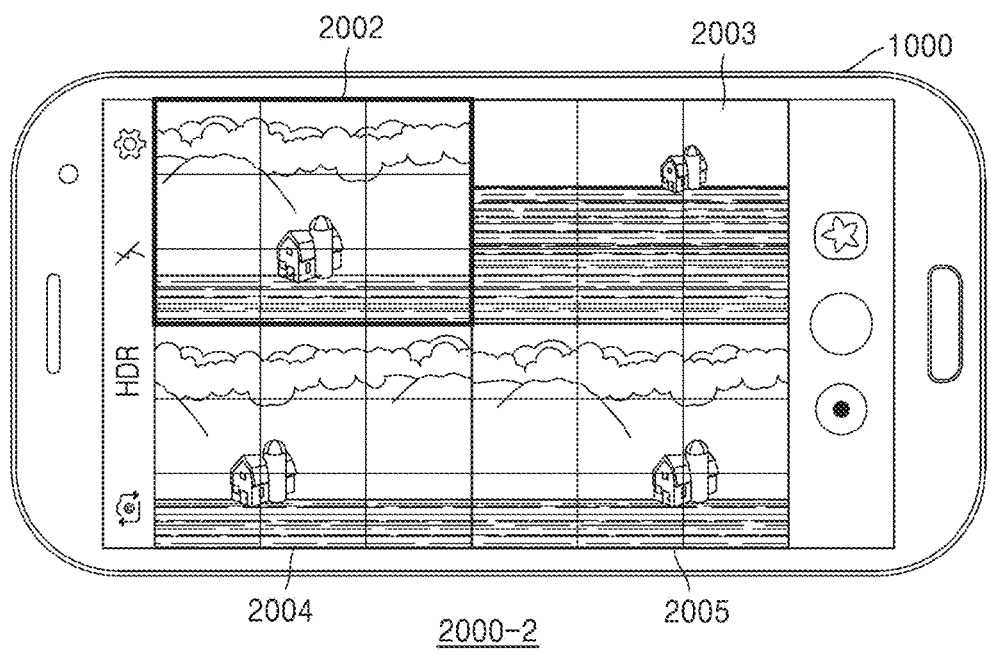

FIG. 24
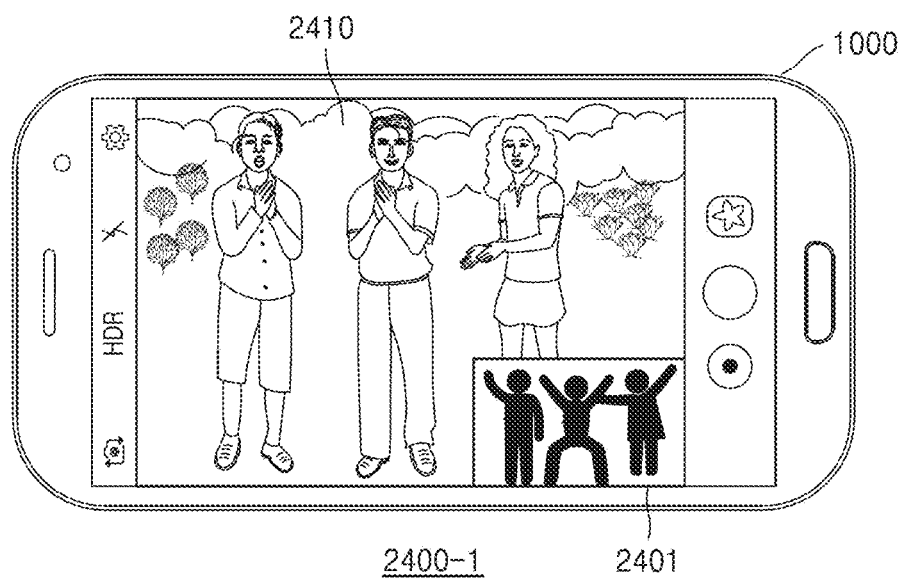
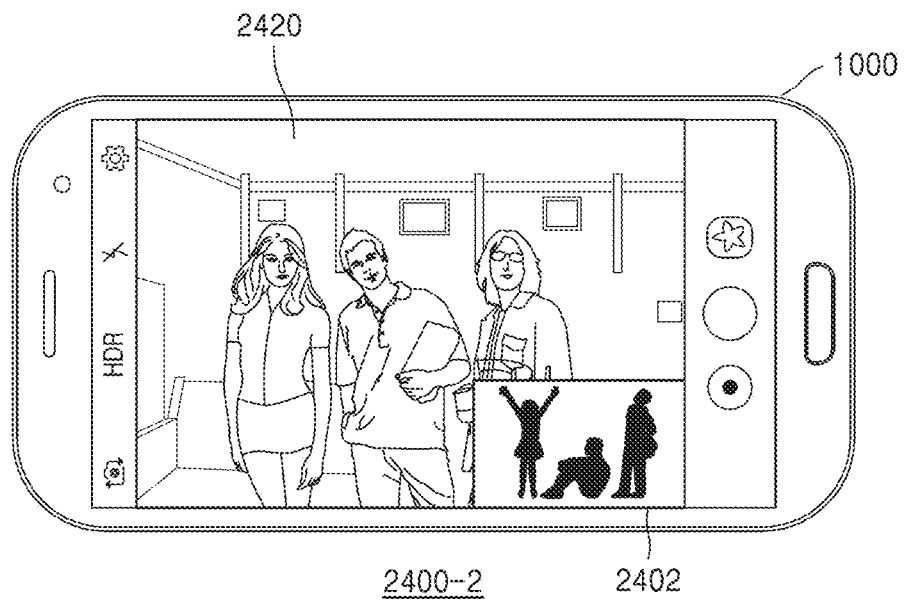

US 11,146,724 B2

METHOD AND SYSTEM FOR PROVIDING RECOMMENDATION INFORMATION RELATED TO PHOTOGRAPHY

CROSS-REFERENCE TO RELATED APPLICATION(S)

This application is based on and claims priority under 35 U.S.C. § 119 of a Korean patent application number 10-2017-0164328, filed on Dec. 1, 2017, in the Korean Intellectual Property Office, the disclosure of which is incorporated by reference herein in its entirety.

BACKGROUND

1. Field

The disclosure relates to artificial intelligence (AI) systems for simulating functions of the human brain such as recognition and decision-making by using machine learning algorithms such as deep learning, and applications of the AI systems. More particularly, the disclosure relates to methods and apparatuses for providing recommendation information related to photography by using AI systems.

2. Description of Related Art

An artificial intelligence (AI) system is a computer system configured to realize human-level intelligence and get smarter through self-learning and making decisions spontaneously, unlike an existing rule-based smart system. The more an AI system is used, the more its recognition rate improves and the more accurately it understands a user's taste, and thus, the rule-based smart system is gradually being replaced by a deep learning-based AI system.

AI technology includes machine learning (e.g., deep learning) and element technologies that use machine learning.

Machine learning is an algorithm technology that self-classifies and learns characteristics of input data, and element technologies are technologies using a machine learning algorithm such as deep learning to simulate functions of the human brain such as recognition and decision-making, and include technical fields such as linguistic understanding, visual understanding, inference/prediction, knowledge representation, and motion control.

Various fields to which AI technology is applied are as follows. Linguistic understanding is a technology for recognizing and applying/processing human languages/characters and includes natural language processing, machine translation, dialog systems, questions and answering, and voice recognition/synthesis. Visual understanding is a technology for recognizing and processing objects in the manner of a human visual system and includes object recognition, object tracking, image searching, person recognition, scene understanding, spatial understanding, and image enhancement. Inference/prediction is a technology for judging information and logically inferring and predicting the same and includes knowledge/probability-based reasoning, optimization prediction, preference-based planning, and recommendation. Knowledge representation is an automation technology for incorporating human experience information into knowledge data and includes knowledge building (e.g., data generation/classification), and knowledge management (e.g., data utilization). Motion control is a technology for controlling self-driving of autonomous vehicles and the motion of robots and includes movement control (e.g., navigation, collision avoidance, or driving), and manipulation control (e.g., behavior control).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for providing recommendation information (e.g., at least one recommended photographing composition, a recommendation setting value, and at least one recommended pose) related to photography by using a subject and surrounding environment information of the subject.

Additional aspects will be set forth in part in the description which follows and, in part, will be apparent from the description, or may be learned by practice of the presented embodiments.

In accordance with an aspect of the disclosure, a method by which an electronic apparatus provides recommendation information related to photography is provided. The method includes identifying a subject included in a preview image recognized by a first camera, obtaining information of the identified subject, obtaining information related to light in surroundings of the identified subject, determining a recommended photographing composition based on the information of the identified subject and the information related to the light in the surroundings of the subject, and providing information about the recommended photographing composition.

In accordance with another aspect of the disclosure, an electronic apparatus is provided. The electronic apparatus includes an output interface for displaying a preview image including a subject recognized by a first camera, a sensor for obtaining information related to light in surroundings of the subject, and at least one processor configured to identify the subject included in the preview image, obtain information of the identified subject, determine a recommended photographing composition based on the information of the identified subject and the information related to the light in the surroundings of the subject, and provide information about the recommended photographing composition.

In accordance with another aspect of the disclosure, a computer program product is provided. The computer program product includes a computer-readable storage medium, wherein the computer-readable storage medium includes instructions for identifying a subject included in a preview image recognized by a first camera, obtaining information of the identified subject, obtaining information related to light in surroundings of the identified subject, determining a recommended photographing composition based on the information of the identified subject and the information related to the light in the surroundings of the subject, and providing information about the recommended photographing composition.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a view for describing an operation of detecting a current photographing composition, according to an embodiment of the disclosure;

FIG. 8 is a view for describing a photographing setting value according to an embodiment of the disclosure;

FIG. 10 is a view for describing use of dual cameras according to an embodiment of the disclosure;

FIGS. 12 and 13 are views for describing an operation of displaying information for guiding a recommended photographing composition on a maximum viewing angle image, according to various embodiments of the disclosure;

FIGS. 14 and 15 are views for describing an operation by which the electronic apparatus displays information about a recommended photographing composition, according to various embodiments of the disclosure;

FIG. 17 is a view for describing an operation by which the electronic apparatus executes an artificial intelligence (AI) assistant application, according to an embodiment of the disclosure;

FIGS. 19, 20, and 21 are views for describing an operation by which the electronic apparatus displays information about a plurality of recommended photographing compositions, according to various embodiments of the disclosure;

FIG. 24 is a view for describing an operation of providing information about a recommended pose by using the number of subjects and surrounding environment information of the subjects, according to an embodiment of the disclosure;

Throughout the drawings, it should be noted that like reference numbers are used to depict the same or similar elements, features, and structures.

DETAILED DESCRIPTION

Figure 1:
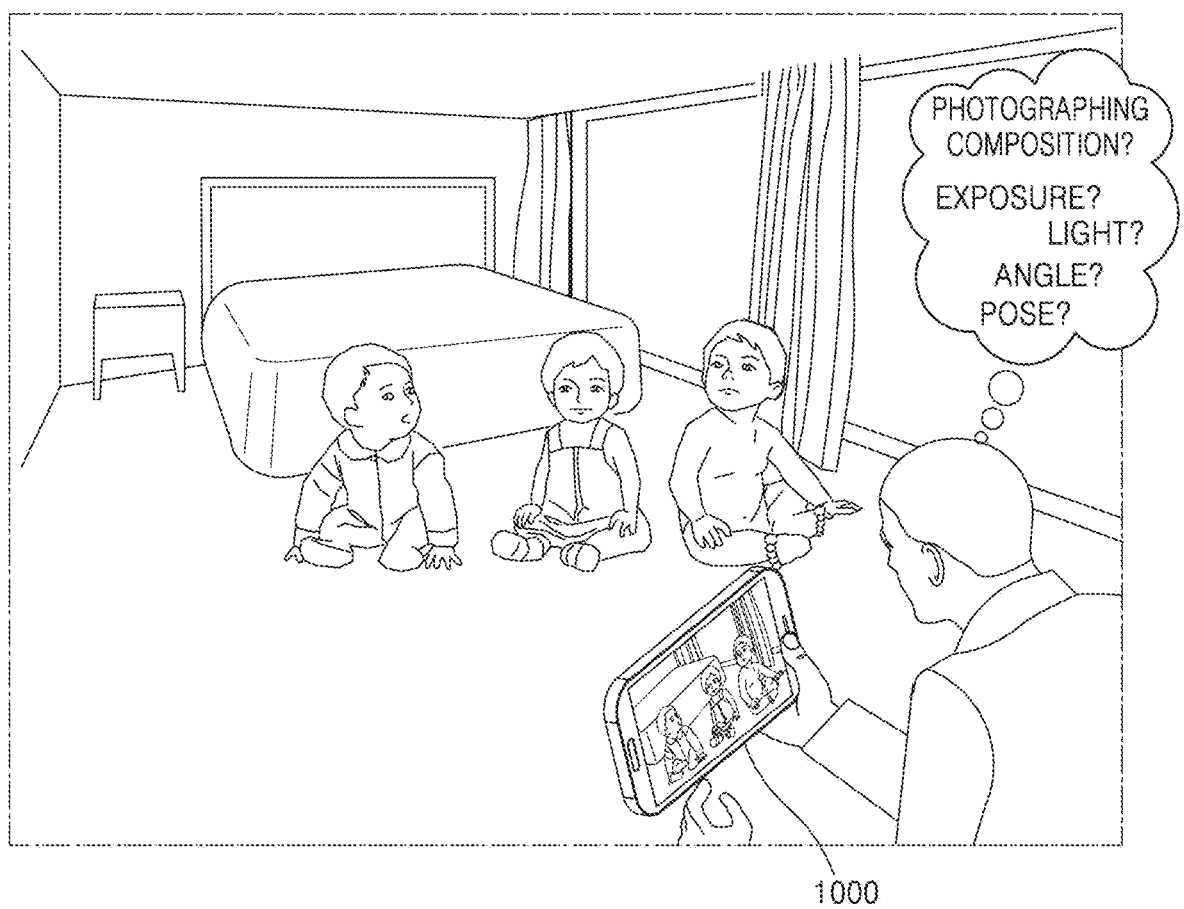
FIG. 1 is a view for describing a photography system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skill in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a part "includes" an element, it is to be understood that the part additionally includes other elements rather than excluding other elements as long as there is no particular opposing recitation. Also, the terms such as " . . . unit", "module", or the like used in the specification indicate a unit, which processes at least one function or motion, and the unit may be implemented by hardware or software, or by a combination of hardware and software.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

As used herein, the term "and/or" includes any and all combinations of one or more of the associated listed items. Expressions such as "at least one of," when preceding a list of elements, modify the entire list of elements and do not modify the individual elements of the list.

FIG. 1 is a view for describing a photography system according to an embodiment of the disclosure.

Referring to FIG. 1, the photography system according to an embodiment may include an electronic apparatus 1000. According to an embodiment, the photography system may further include a server (not shown) in addition to the electronic apparatus 1000. An embodiment where the photography system includes the electronic apparatus 1000 and the server will be described below in detail with reference to FIG. 16.

According to an embodiment, the electronic apparatus 1000 may refer to a device for obtaining at least one frame of a subject. For convenience of explanation, the at least one frame of the subject may be represented as an image or a photograph.

According to an embodiment, the subject may refer to an object to be photographed. The subject may be a moving object such as a person, an animal, an insect, or a vehicle, an immovable object such as a building, a statue, a picture, or a rock, a plant such as a tree or a flower, a landscape such as a sea, a mountain, or a sunset, or a natural phenomenon such as a lunar eclipse or a solar eclipse.

The electronic apparatus 1000 according to an embodiment may be implemented in any of various forms. Examples of the electronic apparatus 1000 described herein may include, but are not limited to, a digital camera, a smartphone, a laptop computer, a tablet PC, an electronic book terminal, a digital broadcast terminal, a personal digital assistant (PDA), a portable multimedia player (PMP), a navigation system, and an MP3 player. The electronic apparatus 1000 described herein may be a wearable device that may be worn on a user. The wearable device may be at least one of an accessory-type device (e.g., a watch, a ring, a bracelet, an anklet, a necklace, glasses, or contact lenses), a head-mounted-device (HMD), a fabric or clothing-integrated device (e.g., electronic clothing), a body-attachable device (e.g., a skin pad), and a bio-implantable device (e.g., an implantable circuit). Hereinafter, for convenience of description, the following will be described on the assumption that the electronic apparatus 1000 is a digital camera or a smartphone equipped with a camera.

According to an embodiment, a user of the electronic apparatus 1000 may take a photograph of the subject by using the electronic apparatus 1000. In this case, the user of the electronic apparatus 1000 may determine a photographing composition, adjust a photographing setting value, or adjust a pose of the subject in order to take a nice photograph. However, it is different for ordinary users who are not familiar with photography to take a nice photograph like professional photographers.

Accordingly, according to an embodiment, the electronic apparatus 1000 may provide recommendation information related to photography so that ordinary users may take a nice photograph. For example, the electronic apparatus 1000 may provide, to the user, at least one from among, but not limited to, recommendation information related to a photographing composition, recommendation information related to a photographing setting value, and recommendation information related to a pose of the subject.

An operation by which the electronic apparatus 1000 provides recommendation information (e.g., recommendation of a photographing composition) related to photography by using a subject and surrounding environment information of the subject will now be described in detail with reference to FIG. 2.

Figure 2:
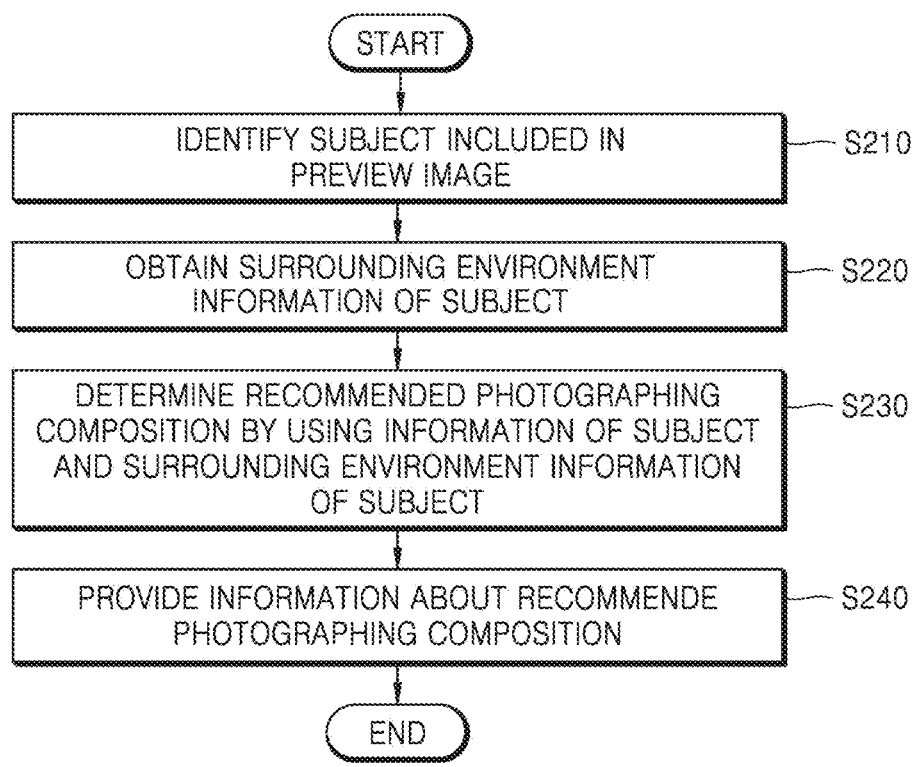
FIG. 2 is a flowchart for describing a method by which an electronic apparatus provides recommendation information related to photography, according to an embodiment of the disclosure.

FIG. 2 is a flowchart for describing a method by which the electronic apparatus 1000 provides recommendation information related to photography according to an embodiment of the disclosure.

In operation S210, the electronic apparatus 1000 may identify a subject included a preview image recognized through a first camera. The preview image may be an image that may be previewed by a user through a viewfinder or a screen before photographing.

According to an embodiment, the electronic apparatus 1000 may identify the subject included in the preview image by analyzing the preview image. In this case, according to an embodiment, the electronic apparatus 1000 may identify the subject included in the preview image by using a learning network model of an artificial intelligence (AI) system.

According to an embodiment, the electronic apparatus 1000 may determine a type of the subject included in the preview image. For example, the electronic apparatus 1000 may determine whether the subject is a person, an animal, a landscape, a natural object, or a food.

According to an embodiment, the electronic apparatus 1000 may determine the number of subjects. For example, when the subject is a person, the electronic apparatus 1000 may determine whether the person included in the preview image is one person or a group. Also, when the subject is a group, the electronic apparatus 1000 may determine how many people are included in the group.

According to an embodiment, the electronic apparatus 1000 may determine a main subject by using focus information or information about a ratio of spaces occupied by subjects. For example, when a field, a person, and a tree are included in the preview image, the electronic apparatus 1000 may determine the person as a main subject or may determine the tree as a main subject according to a ratio of spaces occupied by the person and the tree on the preview image. Also, the electronic apparatus 1000 may determine one focused person from among people included in the preview image as a main subject.

According to an embodiment, the electronic apparatus 1000 may determine a main subject according to a user input. For example, the electronic apparatus 1000 may determine a subject selected by the user as an object of interest as a main subject.

According to an embodiment, the electronic apparatus 1000 may identify the subject included in the preview image through a server. For example, when transmitting information about the preview image (e.g., the preview image or feature information extracted from the preview image) to the server, the electronic apparatus 1000 may request the server to identify the subject included in the preview image. In this case, the server may identify the subject included in the preview image by analyzing the information about the preview image by using the learning network model. The server may transmit identification information of the subject (e.g., a type of the subject, the number of subjects, and a main subject) to the electronic apparatus 1000.

In operation S220, the electronic apparatus 1000 may obtain surrounding environment information of the identified subject.

According to an embodiment, the surrounding environment information of the subject may include at least one of information related to light, information related to a place, information related to a time, and information related to weather.

According to an embodiment, the electronic apparatus 1000 may obtain information related to light in surroundings of the subject as the surrounding environment information of the subject. For example, the information related to the light in the surroundings of the subject may include, but is not limited to, a type of light (e.g., natural light, direct light, diffused light, artificial light, front light, side light, or backlight), scattering of light, a direction of light, an intensity of light, a position of the sun, an illuminance, auxiliary light (strobe) (e.g., an internal strobe of a camera, an external strobe, a ring strobe, or a reflective plate), position information (e.g., global positioning system (GPS) coordinates, a region, or a country), whether a location is indoors (e.g., a general home, an office, a banquet hall, a performance hall, or an exhibition) or outdoors (e.g., a forest, a beach, a sea, or a firework), a time (e.g., midday, a sunrise and a sunset, backlight, right after a sunset, or a late night), weather (e.g., a rainy day, a snowy day, or a winter snow scene (after snow stops), and a season.

According to an embodiment, the electronic apparatus 1000 may obtain the information related to the light in the surroundings of the subject by using a current position of the electronic apparatus 1000 and a current position of the sun. For example, the electronic apparatus 1000 may recognize a current position by using a position sensor (e.g., a GPS) and may recognize a position of the sun (e.g., a direction or an altitude) by using current time information. In this case, the position of the sun may be an absolute position of the sun, or may be a relative position from the electronic apparatus 1000 or the subject. For example, the electronic apparatus 1000 may recognize that the sun is located at a low altitude in a northeast direction from the subject.

According to an embodiment, the electronic apparatus 1000 may obtain the surrounding environment information (e.g., the information related to the light in the surroundings of the identified subject) of the subject by analyzing the preview image. In this case, according to an embodiment, the electronic apparatus 1000 may obtain the surrounding environment information of the subject from the preview image by using the learning network model (e.g., an AI model) of the AI system. For example, the electronic apparatus 1000 may determine whether it is daytime or nighttime or may determine a direction of light, an intensity of light, or a position of the sun by analyzing light and shade, a shadow, or the sun included in the preview image. Also, the electronic apparatus 1000 may determine whether a season is spring, summer, autumn, or winter or may determine whether a location is indoors or outdoors by analyzing the subject included in the preview image. For example, the electronic apparatus 1000 may determine that a season is summer when the subject wears a short-sleeve shirt and may determine that a season is winter when the subject stands on snow.

According to an embodiment, the electronic apparatus 1000 may obtain information related to light emitted from the subject in the preview image by analyzing the preview image. For example, when a night scene is included in the preview image, the electronic apparatus 1000 may recognize, but is not limited to, light emitted by a lighting device (e.g., a street lamp or a car light) included in the preview image, light emitted by a planet (e.g., the moon, a star, the Venus, or the milky way), light emitted by a campfire, or light emitted by a firecracker. The electronic apparatus 1000 may obtain information about the impression of a color, an intensity, and an illuminance of light emitted by the subject in the preview image.

According to an embodiment, the electronic apparatus 1000 may obtain the surrounding environment information (e.g., the information related to the light in the surroundings of the identified subject) of the subject by using at least one sensor. For example, the electronic apparatus 1000 may obtain information such as a current position of the subject or whether the subject exists indoors or outdoors by using a position sensor.

According to an embodiment, the electronic apparatus 1000 may obtain an illuminance value of the surroundings of the subject. Also, the electronic apparatus 1000 may determine whether the surroundings of the subject are currently in daytime or nighttime by using an illuminance sensor.

According to an embodiment, the electronic apparatus 1000 may obtain temperature information of the surroundings of the subject by using a temperature sensor, and may obtain humidity information of the surroundings of the subject by using a humidity sensor.

According to an embodiment, the electronic apparatus 1000 may obtain the surrounding environment information by using a plurality of image sensors (or a plurality of cameras). For example, the electronic apparatus 1000 may obtain a first image (e.g., a maximum viewing angle image) having a viewing angle greater than that of the preview image by using a second camera different from the first camera that obtains the preview image. The electronic apparatus 1000 may obtain the surrounding environment information (e.g., the information related to the light in the surroundings of the subject) of the subject by analyzing the obtained first image (e.g., the maximum viewing angle image). Since the maximum viewing angle image includes more surrounding information than the preview image, information obtained by analyzing the maximum viewing angle image may be more precise than information obtained by analyzing the preview image. An operation by which the electronic apparatus 1000 obtains the surrounding environment information by using dual cameras will be described below in detail with reference to FIG. 9.

In operation S230, the electronic apparatus 1000 may determine a recommended photographing composition by using information of the identified subject and the surrounding environment information of the subject. The information of the identified subject may include at least one of, but not limited to, a type of the subject, the number of subjects, a main subject, a pose of the subject, and a color of the subject.

According to an embodiment, the recommended photographing composition may refer to a photographing composition, a photographing area, or a photographing angle recommended by the electronic apparatus 1000 to the user of the electronic apparatus 1000.

Figure 4:
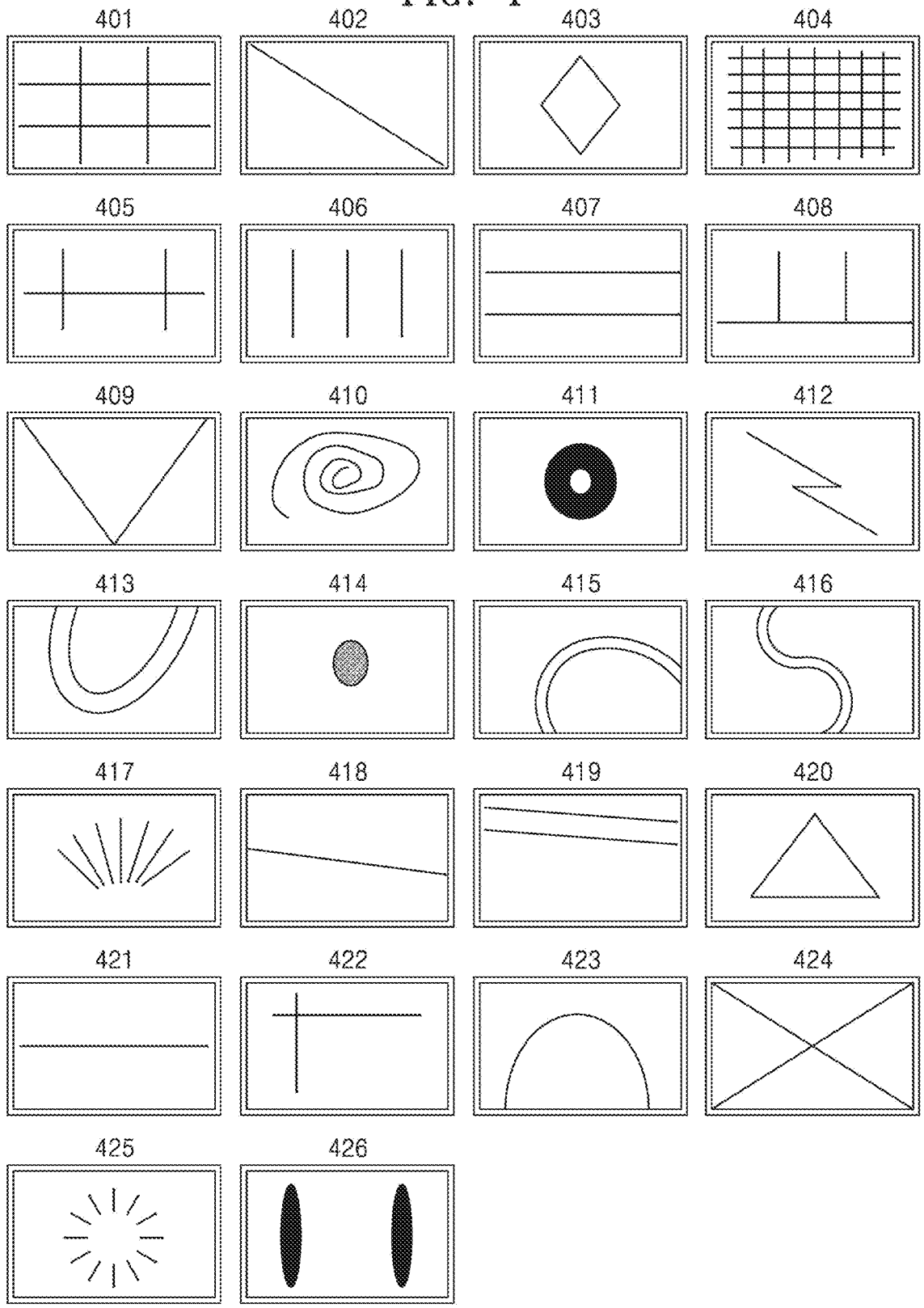
FIG. 4 is a view for describing photographing compositions according to an embodiment of the disclosure.

The photographing composition may refer to an arrangement of subjects (or a background) in a frame. For example, referring to FIG. 4, the photographing composition may include, but is not limited to, a golden division composition/rule-of-thirds composition 401, a perfect diagonal composition 402, a diamond-shaped composition 403, a checkerboard composition 404, a parallel horizontal composition 405, a vertical composition 406, a horizontal one-third composition 407, a horizontal and vertical composition 408, an inverted triangular composition 409, a spiral composition 410, a circular composition 411, a lightning-shaped composition 412, a U-shaped composition 413, a central composition 414, a C-shaped composition 415, an S-shaped composition 416, a fan-shaped composition 417, a diagonal composition 418, a parallel diagonal composition 419, a triangular composition 420, a horizontal composition 421, a cross-shaped composition 422, an arched composition 423, an X-shaped diagonal composition 424, a radial composition 425, and a bilateral symmetrical composition 426.

According to an embodiment, the electronic apparatus 1000 may determine the recommended photographing composition by using the AI model. For example, the electronic apparatus 1000 may determine the recommended photographing composition by using the learning network model (e.g., the AI model) trained based on photographs taken by professionals. The learning network model (e.g., the AI model) trained based on the photographs taken by the professionals will be described below in detail with reference to FIG. 3.

According to an embodiment, the electronic apparatus 1000 may determine the recommended photographing composition according to a type of the identified subject and the number of subjects. For example, when the subject is a food and several dishes are located, the electronic apparatus 1000 may determine a first photographing composition suitable for an image where several foods are arranged as a recommended photographing composition, and when the subject is one person, the electronic apparatus 1000 may determine a second photographing composition as a recommended photographing composition.

According to an embodiment, the electronic apparatus 1000 may determine the recommended photographing composition by using the information of the identified subject and the information related to the light in the surroundings of the subject.

For example, when foods that are subjects are located outdoors, the electronic apparatus may determine a third photographing composition as a recommended photographing composition in consideration of a direction of light, and when foods that are subjects are located indoors, the electronic apparatus 1000 may determine a fourth photographing composition as a recommended photographing composition.

According to an embodiment, the electronic apparatus 1000 may determine a composition where the sun is not backlight as the recommended photographing composition, in consideration of a position of the sun. Alternatively, when the sun is backlight, the electronic apparatus 1000 may determine a composition where the subject looks best as the recommended photographing composition.

Also, the electronic apparatus 1000 may determine the recommended photographing composition for long exposure photography by using information emitted by the subject or information related to light emitted by an object around the subject. For example, the electronic apparatus 1000 may determine an S-shaped composition where the subject is located on the right as the recommended photographing composition for long exposure photography, in consideration of a direction, an intensity, and the impression of a color of light of a street lamp. Alternatively, the electronic apparatus 1000 may determine an exposure where the land occupies ⅓ and the sky occupies ⅔ on the preview image as the recommended photographing composition for long exposure photography, in consideration of a position and a brightness of the moon or a star.

According to an embodiment, as a result obtained by checking the information related the light in the surroundings of the subject, when it is nighttime and a location is outdoors, a good photograph may be obtained by using long exposure. Accordingly, the electronic apparatus 1000 may recommend a photographing setting value for long exposure photography. A method by which the electronic apparatus 1000 recommends the photographing setting value will be described below in detail with reference to FIG. 7.

According to an embodiment, the electronic apparatus 1000 may determine the recommended photographing composition by using photographs taken by professionals. For example, when the subject is a particular building (e.g., the Taj Mahal shown in FIG. 11) and the sun is located at the left of the building, the electronic apparatus 1000 may determine a fifth photographing composition as the recommended photographing composition, based on photographs taken when the sun is located at the left of the building from among a plurality of photographs taken by professionals who have photographed the building. Alternatively, when the subject is a particular mountain (e.g., Mt. Everest) and the mountain is foggy as a result obtained by analyzing the surrounding environment information, the electronic apparatus 1000 may determine a sixth photographing composition as the recommended photographing composition, based on photographs taken on a foggy morning from among photographs taken by professionals who photographed the mountain. According to an embodiment, when the subject is a particular beach (e.g., Waikiki beach) and there is a sunset as a result obtained by analyzing the surrounding environment information, the electronic apparatus 1000 may determine a photographing composition of a professional who well represents the sunset of the beach as the recommended photographing composition.

According to an embodiment, when the identified subject is a tall building and a characteristic object does not exist in the surroundings as an analysis result based on the maximum viewing angle image, the electronic apparatus 1000 may determine a vertical mode as the recommended photographing composition. Also, when the subject is several people and the people stand on a wide lawn outdoors as an analysis result based on the maximum viewing angle image, the electronic apparatus 1000 may determine a horizontal mode as the recommended photographing composition.

According to an embodiment, when a main subject is a person and there is a projecting subject such as a tree or a pillar on a background as a result obtained by analyzing the preview image, the electronic apparatus 1000 may determine a composition where the tree or the pillar does not overlap the person as the recommended photographing composition. Also, when a main subject is a person and a beach is a background as a result obtained by analyzing the preview image, the electronic apparatus 1000 may determine a composition where the horizon of the sea does not pass through the person's eyes or neck as the recommended photographing composition.

According to an embodiment, when a main subject is a person, the electronic apparatus 1000 may determine the recommended photographing composition in consideration of the person's gaze. For example, when the gaze of the person who is the subject is on the right, the electronic apparatus 1000 may determine a composition where there is a space on the right as the recommended photographing composition, and when the gaze of the person is on the left, the electronic apparatus 1000 may determine a composition where there is a space on the left as the recommended photographing composition.

According to an embodiment, when a person is photographed outdoors, the electronic apparatus 1000 may determine a composition where a portrait photograph may be taken in harmony with a background as the recommended photographing composition. For example, the electronic apparatus 1000 may determine a rule-of-thirds composition as the recommended photographing composition. The rule-of-thirds composition refers to a composition where a frame is divided by two virtual horizontal lines and two virtual vertical lines and the subject is placed along virtual intersections. A stable photograph may be obtained when photographing in the rule-of-thirds composition.

According to an embodiment, the electronic apparatus 1000 may determine the recommended photographing composition in consideration of a photographing area and a photographing angle. For example, when only a portion over a person's neck is included in the preview image, the electronic apparatus 1000 may determine a composition where a portion over the person's chest may be included in the preview image in consideration of the surrounding environment information as the recommended photographing composition. In this case, the recommended photographing composition may include information for reducing a zoom magnification from a current magnification (zoom out) and reducing an angle of a camera.

According to an embodiment, the electronic apparatus 1000 may transmit the information about the preview image or the surrounding environment information of the subject to the server and may request the server to recommend a photographing composition. In this case, the server may determine the recommended photographing composition by using the information about the preview image or the surrounding environment information of the subject, and may transmit information about the determined recommended photographing composition to the electronic apparatus 1000. An operation by which the electronic apparatus 1000 interoperates with the server to determine the recommended photographing composition will be described below in detail with reference to FIG. 16.

In operation S240, the electronic apparatus 1000 may provide the information about the determined recommended photographing composition.

According to an embodiment, the electronic apparatus 1000 may determine a current photographing composition from the preview image. For example, the electronic apparatus 1000 may determine the current photographing composition according to a shape and a position of the subject. Alternatively, the electronic apparatus 1000 may detect lines on the preview image and may determine the current photographing composition by using the detected lines.

According to an embodiment, the electronic apparatus 1000 may compare the recommended photographing composition with the current photographing composition. When a similarity between the recommended photographing composition and the current photographing composition is less than a threshold value (e.g., 97%) as a result of the comparison, the electronic apparatus 1000 may provide information about the recommended photographing composition. According to an embodiment, when a similarity between the recommended photographing composition and the current photographing composition is equal to or greater than the threshold value (e.g., 97%), the electronic apparatus 1000 may not provide the information about the recommended photographing composition.

According to an embodiment, the electronic apparatus 1000 may provide the information about the recommended photographing composition by outputting information for guiding the recommended photographing composition. In this case, the electronic apparatus 1000 may output the information for guiding the recommended photographing composition by using at least one of, but not limited to, a video signal, an audio signal, and a vibration signal. For example, the electronic apparatus 1000 may display text or an icon for guiding the recommended photographing composition on the preview image. The electronic apparatus 1000 may output a voice (e.g., "Slightly move the camera down and right") for guiding the recommended photographing composition.

According to an embodiment, the electronic apparatus 1000 may determine a plurality of recommended photographing compositions by using the information of the subject and the surrounding environment information of the subject. In this case, the electronic apparatus 1000 may provide thumbnail images respectively corresponding to the plurality of recommended photographing compositions. Also, the electronic apparatus 1000 may provide preview images respectively corresponding to the plurality of recommended photographing compositions. An operation by which the electronic apparatus 1000 provides information about the plurality of recommended photographing compositions will be described below in detail with reference to FIG. 18.

Figure 3:
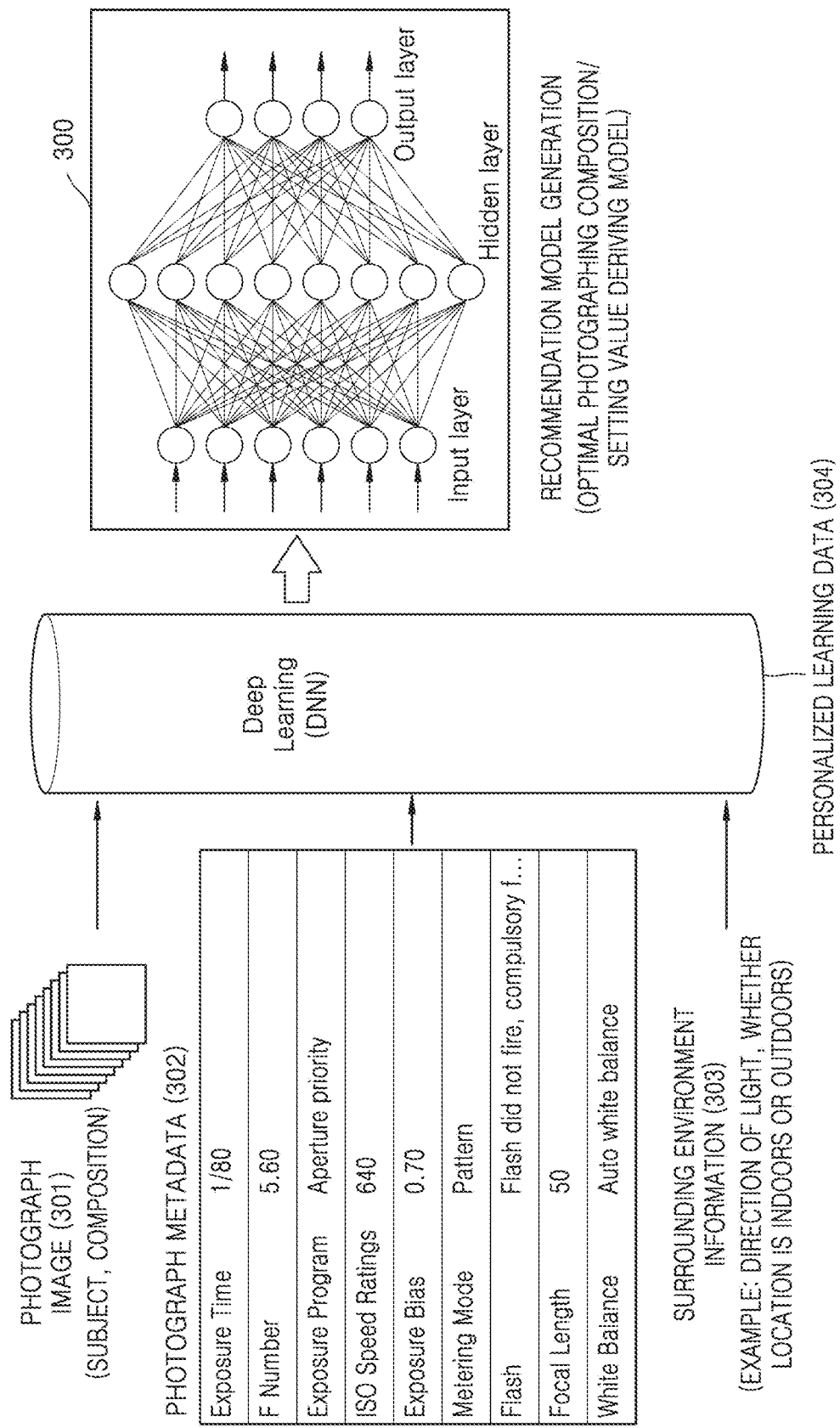
FIG. 3 is a diagram for describing an operation of generating a recommendation model through deep learning, according to an embodiment of the disclosure.

FIG. 3 is a diagram for describing an operation of generating a recommendation model through deep learning according to an embodiment of the disclosure.

Referring to FIG. 3, according to an embodiment, an AI processor included in a server or the electronic apparatus 1000 may generate a recommendation model 300 that recommends a photographing composition or derives a photographing setting value by training an artificial neural network. When the artificial neural network is 'trained', it may mean that a mathematical model that allows connections of neurons constituting the artificial neural network to make an optimal determination by appropriately changing weights based on data is created.

According to an embodiment, the AI processor may obtain photograph images 301, photograph metadata 302, and surrounding environment information 303, and may generate the recommendation model 300 by using the photograph images 301, the photograph metadata 302, and the surrounding environment information 303.

According to an embodiment, the photograph images 301 obtained by the AI processor may be many photograph images taken by professionals, and may include information about a subject and a photographing composition. According to an embodiment, the photograph image 301 may be a still image, or a plurality of frames included in a video.

According to an embodiment, the photograph metadata 302 may include, but is not limited to, a camera maker, a camera model, a lens type, an image editor (software), a date/time when a photograph is edited, an exchangeable image file format (Exif) version, a shooting date/time, an actual size of a photograph, an exposure time (or a shutter speed), an exposure program, a lens focal length, an F-number of a stop, whether a flash is used, and a white balance. According to an embodiment, the photograph metadata 302 may be Exif data.

According to an embodiment, the surrounding environment information 303 may refer to information related to a surrounding environment of the subject included in the photograph image 301. For example, the surrounding environment information 303 may include, but is not limited to, a type of light (e.g., natural light, direct light, diffused light, artificial light, frontal light, side light, or backlight), scattering of light, a direction of light, an intensity of light, a position of the sun, an illuminance, auxiliary light (strobe) (e.g., an internal strobe of a camera, an external strobe, a ring strobe, or a reflective plate), position information (e.g., GPS coordinates, a region, or a country), whether a location is indoors (e.g., a general home, an office, a banquet hall, a performance hall, or an exhibition) or outdoors (e.g., a forest, a beach, a sea, or a firework), a time (e.g., midday, a sunrise and a sunset, backlight, right after a sunset, or a late night), weather (e.g., a rainy day, a snowy day, or a winter snow scene (after snow stops), and a season.

According to an embodiment, the AI processor may model a recommended photographing composition or a recommendation photographing setting value by identifying the photographing composition and the subject from the photograph images 301 of the professionals and matching the identified subject and the identified photographing composition to corresponding metadata (photographing setting value) and corresponding surrounding environment information. According to an embodiment, as the photograph images 301 of the professionals, the corresponding metadata, and the corresponding surrounding environment information collected by the AI processor increase, the recommendation model 300 that derives an optimal photographing composition and an optimal photographing setting value may be modified.

According to an embodiment, the AI processor may obtain personalized learning data 304. The personalized learning data 304 may be data about an individual's photographic taste. For example, the personalized learning data 304 may include, but is not limited to, data about a photographing composition (or a photographing setting value) preferred by the individual, data about a photographing composition (or a photographing setting value) not selected by the individual, data about photographing compositions (or photographing setting values) of photographs deleted by the individual, data about whether a recommended photographing composition (or a photographing setting value) is applied, and data about a photograph finally taken by the individual.

According to an embodiment, the AI processor may generate the recommendation model 300 for each individual by using the personalized learning data 304 in addition to the photograph image 301, the photograph metadata 302, and the surrounding environment information 303. For example, the AI processor may recommend a first photographing composition to a first user and a second photographing composition to a second user under the same surrounding environment for the same subject, by using the personalized learning data 304.

An embodiment where the electronic apparatus 1000 detects a current photographing composition from a preview image and provides information about a recommended photographing composition by using the recommendation model 300 will now be described with reference to FIGS. 5 and 6.

FIG. 5 is a view for describing an operation of detecting a current photographing composition according to an embodiment of the disclosure.

Referring to FIG. 5, the electronic apparatus 1000 may determine a current photographing composition (for convenience of explanation, referred to as a 'current composition') according to a shape and a position of a subject. For example, the electronic apparatus 1000 may detect points or lines in relation to the subject on a preview image. The electronic apparatus 1000 may determine a current photographing composition by using the detected points or lines.

Referring to 510 of FIG. 5, when a user is to photograph the Taj Mahal and surroundings of the Taj Mahal by using the electronic apparatus 1000, the Taj Mahal and a surrounding environment may be included in the preview image. In this case, the electronic apparatus 1000 may detect a line 1 that connects a pillar located at the right of the Taj Mahal, a line 2 that connects a pillar located at the left of the Taj Mahal, lines 3 that connect the vertex of the Taj Mahal and the two pillars, and a horizon 4, on the preview image. The electronic apparatus 1000 may determine the Taj Mahal on the preview image as a main subject, and may determine that a current photographing composition is a triangular composition 420 based on the lines 3 that connect the vertex of the Taj Mahal and the two pillars.

Referring to 520 of FIG. 5, when it is determined that the current photographing composition is the triangular composition 420, the electronic apparatus 1000 may determine a virtual central line 500 that halves a triangle connecting the vertex of the Taj Mahal and the two pillars. The electronic apparatus 1000 may determine a composition where the virtual central line 500 is located at the center of the preview image as a recommended photographing composition (for convenience of explanation, referred to as a 'recommendation composition'). A recommendation photographing compassion will now be described in detail with reference to FIG. 6.

Figure 6:
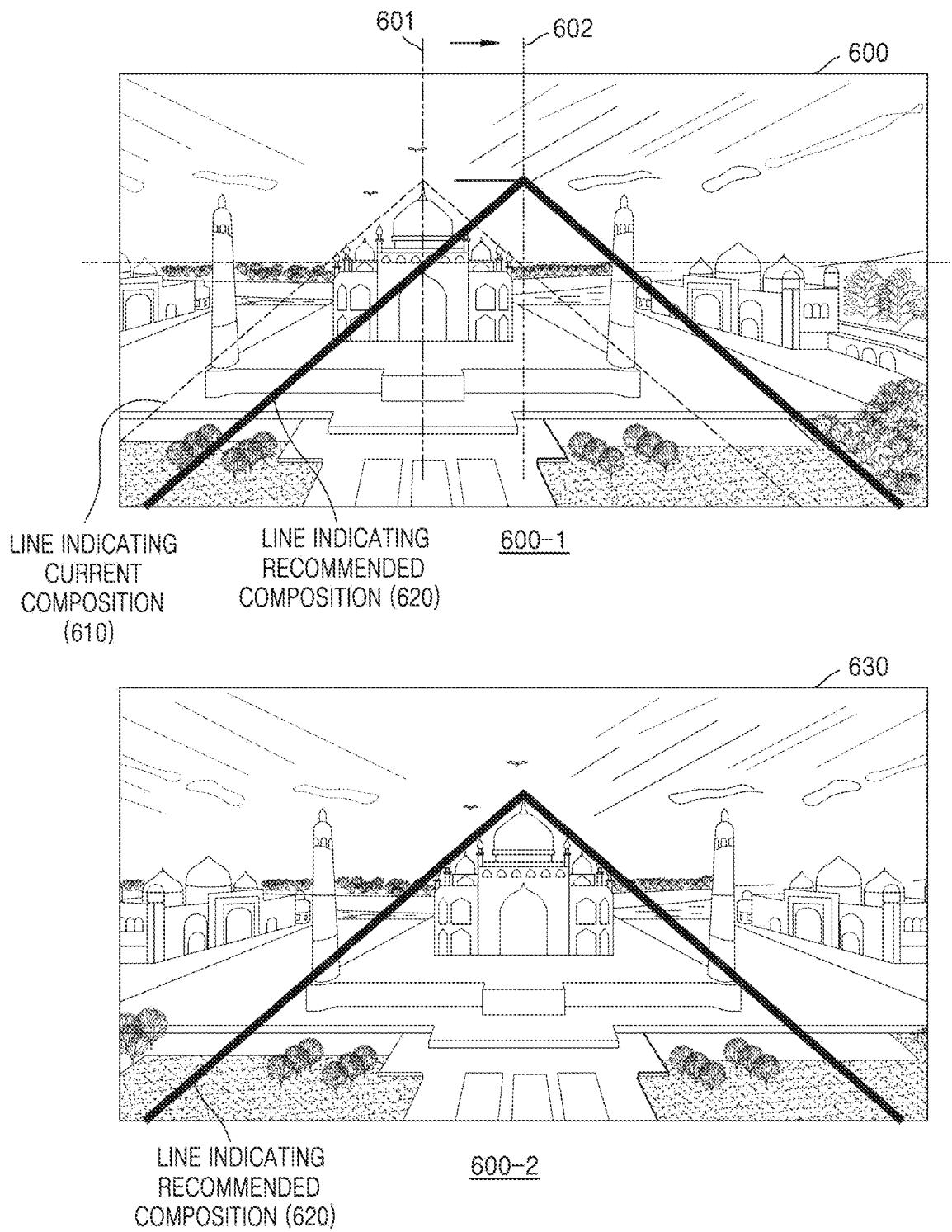
FIG. 6 is a view for describing a recommended photographing composition according to an embodiment of the disclosure.

FIG. 6 is a view for describing a recommended photographing composition according to an embodiment of the disclosure.

Referring to 600-1 of FIG. 6, the electronic apparatus 1000 may detect a current photographing composition on a preview image 600 including the Taj Mahal. The electronic apparatus 1000 may identify a subject included in the preview image 600 and may determine the current photographing composition based on the identified subject.

According to an embodiment, the electronic apparatus 1000 may determine a recommended photographing composition by using the recommendation model 300 trained based on a plurality of photographs. The electronic apparatus 1000 may determine the recommended photographing composition in consideration of information of the subject (e.g., the Taj Mahal) and surrounding environment information (e.g., a height of the sun, a season, weather, or whether a location is outdoors). For example, since the subject is the Taj Mahal, the electronic apparatus 1000 may determine an entire composition as a triangular composition and may determine a composition where a central axis 601 of the current photographing composition moves to a central axis 602 of the preview image 600 as the recommended photographing composition.

According to an embodiment, the electronic apparatus 1000 may provide information for guiding the recommended photographing composition by displaying a line 610 indicating the current photographing composition and a line 620 indicating the recommended photographing composition on the preview image 600. A user may compare the current photographing composition with the recommended photographing composition, and then may slowly move a camera leftward to take a photograph of the recommended photographing composition. In this case, the line 610 indicating the current composition on the preview image 600 may approach the line 620 indicating the recommended photographing composition.

Referring to 600-2 of FIG. 6, when the user slowly moves the camera leftward and the line 610 indicating the current photographing composition and the line 620 indicating the recommended photographing composition overlap each other (e.g., as shown in the preview image 630), the user may select a photographing button. In this case, the electronic apparatus 1000 may obtain a photograph image of the Taj Mahal according to the recommended photographing composition in response to a user input that selects the photographing button.

According to an embodiment, when the line 610 indicating the current photographing composition and the line 620 indicating the recommended photographing composition overlap each other, the electronic apparatus 1000 may automatically perform photographing.

Although lines indicating a current photographing composition and a recommended photographing composition are displayed in order for the electronic apparatus 1000 to guide the recommended photographing composition in FIG. 6, the disclosure is not limited thereto. For example, indicators indicating the current photographing composition and the recommended photographing composition may be represented as any of various shapes other than lines. Also, the electronic apparatus 1000 may guide the recommended photographing composition by using a voice signal.

Figure 7:
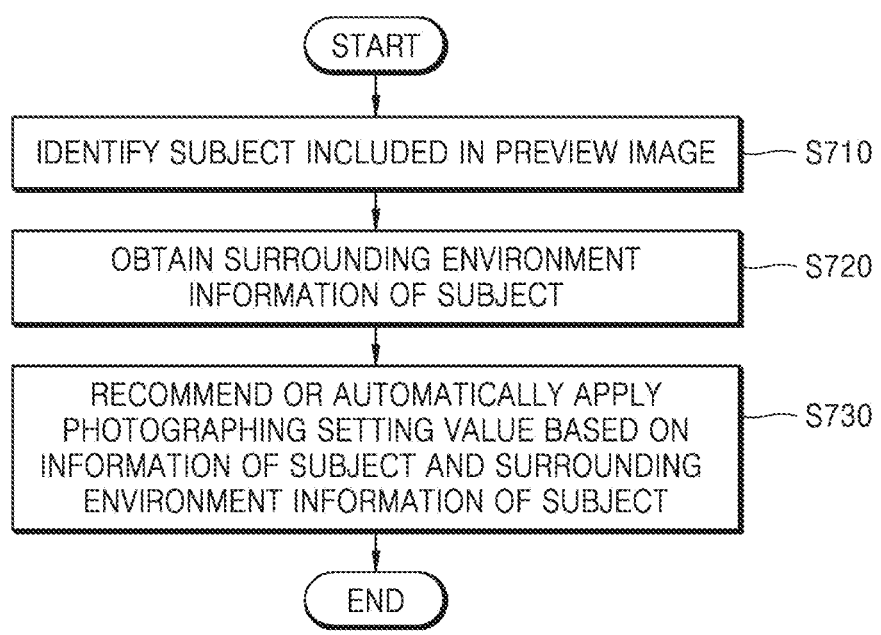
FIG. 7 is a flowchart for describing a method of recommending or automatically applying a photographing setting value, according to an embodiment of the disclosure.

FIG. 7 is a flowchart for describing a method of recommending or automatically applying a photographing setting value according to an embodiment of the disclosure.

In operation S710, the electronic apparatus 1000 may identify a subject included in a preview image. For example, the electronic apparatus 1000 may identify the subject included in the preview image by analyzing the preview image. In this case, according to an embodiment, the electronic apparatus 1000 may identify the subject included in the preview image by using a learning network model of an AI system. Operation S710 corresponds to operation S210 of FIG. 2, and thus a detailed explanation thereof will not be given.

In operation S720, the electronic apparatus 1000 may obtain surrounding environment information of the subject.

According to an embodiment, the electronic apparatus 1000 may obtain the surrounding environment information of the subject by analyzing the preview image. In this case, according to an embodiment, the electronic apparatus 1000 may obtain the surrounding environment information of the subject from the preview image by using the learning network model of the AI system.

According to an embodiment, the electronic apparatus 1000 may obtain the surrounding environment information of the subject by using at least one sensor. For example, the electronic apparatus 1000 may obtain information about a current position of the subject or whether the subject is located indoors or outdoors by using a position sensor. The electronic apparatus 1000 may obtain an illuminance value of surroundings of the subject by using an illuminance sensor. Also, the electronic apparatus 1000 may determine whether the surroundings of the subject are currently in daytime or nighttime by using the illuminance sensor. The electronic apparatus 1000 may obtain temperature information of the surroundings of the subject by using a temperature sensor, and may obtain humidity information of the surroundings of the subject by using a humidity sensor. The electronic apparatus 1000 may obtain the surrounding environment information by using a plurality of image sensors (or a plurality of cameras).

Operation S720 corresponds to operation S220 of FIG. 2, and thus a detailed explanation thereof will not be given.

In operation S730, the electronic apparatus 1000 may recommend or automatically apply a photographing setting value based on information of the subject and the surrounding environment information of the subject. According to an embodiment, the photographing setting value may include, but is not limited to, an F-number of a stop, a shutter speed, an ISO sensitivity, a white balance, and an exposure value.

Figure 8:
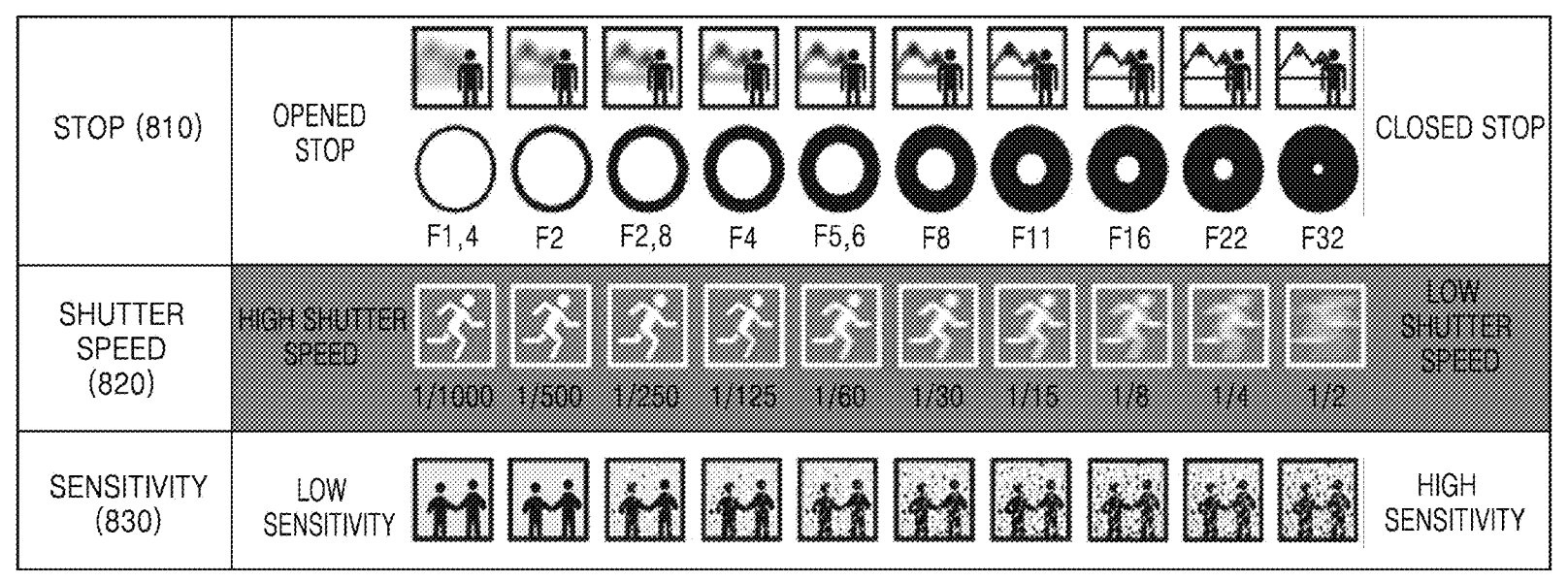

FIG. 8 is a view for describing a photographing setting value according to an embodiment of the disclosure.

Referring to FIG. 8, a stop 810 refers to a size of an aperture of a lens through which light passes. As the stop 810 is closed (right) to increase a depth, a photograph where a near portion and a far portion are focused is output, and as the stop 810 is opened (left) to reduce a depth, a photograph where a subject and a background are separated from each other, referred to as out-focusing, is output. As a shutter speed 820 increases (left), a photograph where a fast moving object appears frozen is output whereas as the shutter speed 820 decreases (right), a blurred photograph is output. As an ISO sensitivity 830 decreases (left), a photograph with small noise is output. As the ISO sensitivity 830 increases (right), noise increases and a photograph with no shake may be taken even in a dark environment.

As the ISO sensitivity 830 decreases (left), a contrast increases. In contrast, as the ISO sensitivity 830 increases, a soft photograph by reducing a contrast is taken. Film grains when the ISO sensitivity 830 is low are thin and lead to a clear photograph. Film grains when the ISO sensitivity 830 is high are thick and lead to a rough photograph.

According to an embodiment, the electronic apparatus 1000 may determine a recommendation photographing setting value based on information of a subject and surrounding environment information of the subject. For example, when the subject is photographed outdoors where the sun is shining brightly in daytime, the electronic apparatus 1000 may determine a shutter speed as $1/4000$ seconds. When the subject is photographed indoors, the electronic apparatus 1000 may determine a shutter speed as $1/60$ seconds. When a star is photographed on a dark night, the electronic apparatus 1000 may determine a shutter speed as 10 seconds or more. According to an embodiment, when the subject is photographed indoors, the electronic apparatus 1000 may determine a photographing setting value according to a color of the subject. For example, when the subject is a black device, the electronic apparatus 1000 may determine an F-number of a stop as 4.0 and may determine a shutter speed as $1/30$ seconds. In contrast, when the subject is a white device, the electronic apparatus 1000 may determine an F-number of the stop as 4.0 like the black device, and may determine a shutter speed as $1/100$ seconds.

According to an embodiment, the electronic apparatus 1000 may recommend a plurality of photographing setting value sets based on the information of the subject and the surrounding environment information of the subject. For example, the electronic apparatus 1000 may recommend a first photographing setting value set (e.g., ISO: 12800, stop: 1.4, and shutter speed: 1), a second photographing setting value set (e.g., ISO: 6400, stop: 2.8, and shutter speed: $1/2$), a third photographing setting value set (e.g., ISO: 3200, stop: 5.6, and shutter speed: $1/4$), a fourth photographing setting value set (e.g., ISO: 1600, stop: 8, and shutter speed: $1/8$), and a fifth photographing setting value set (e.g., ISO: 400, stop: 16, and shutter speed: $1/60$).

According to an embodiment, the electronic apparatus 1000 may receive a user input that selects one from among the plurality of photographing setting value sets. The electronic apparatus 1000 may apply a photographing setting value set selected by a user to a photographing system.

According to an embodiment, the electronic apparatus 1000 may recommend a plurality of photographing setting value sets in which values of the stop 810, the shutter speed 820, and the ISO sensitivity 830 are different but the amounts of light are the same by combinations. For example, the electronic apparatus 1000 may recommend a sixth photographing setting value set (e.g., ISO: 200, stop: 2.8, and shutter speed: $1/2$) and a seventh photographing setting value set (e.g., ISO: 400, stop: 8, and shutter speed: 1) according to the information of the subject and the surrounding environment information of the subject. The sixth photographing setting value set and the seventh photographing setting value set theoretically have the same amount of light. However, since values of the stop 810, the shutter speed 820, and the ISO sensitivity 830 are different from each other, the sixth photographing setting value set may more efficiently photograph a moving subject and may have a lower depth than the seventh photographing setting value set. In contrast, the seventh photographing setting value set may have more noise and a higher depth, and may be more affected by hand shake due to a low shutter speed than the sixth photographing setting value set. The user may compare the sixth photographing setting value set with the seventh photographing setting value set, and may select one of the sixth photographing setting value set and the seventh photographing setting value set according to a type of a desired photograph.

According to an embodiment, when a photographing composition is selected through a movement of a camera, the electronic apparatus 1000 may take a plurality of photographs by applying a plurality of photographing conditions and may provide the plurality of photographs. For example, the electronic apparatus 1000 may take a plurality of photographs by applying the first photographing setting value set (e.g., ISO: 12800, stop: 1.4, and shutter speed: 1), the second photographing setting value set (e.g., ISO: 6400, stop: 2.8, and shutter speed: ½), the third photographing setting value set (e.g., ISO: 3200, stop: 5.6, and shutter speed: ¼), the fourth photographing setting value set (e.g., ISO: 1600, stop: 8, and shutter speed: ⅛), and the fifth photographing setting value set (e.g., ISO: 400, stop: 16, and shutter speed: 1/60), and may provide the plurality of photographs to the user.

The user may select at least one of the plurality of photographs, and may store or delete the selected photograph. In this case, an AI processor of the electronic apparatus 1000 (or an AI processor of a server) may refine the recommendation model 300 by learning photographing setting value information corresponding to photographing setting value information corresponding to the stored photograph or photographing setting value information corresponding to the deleted photograph.

Figure 9:
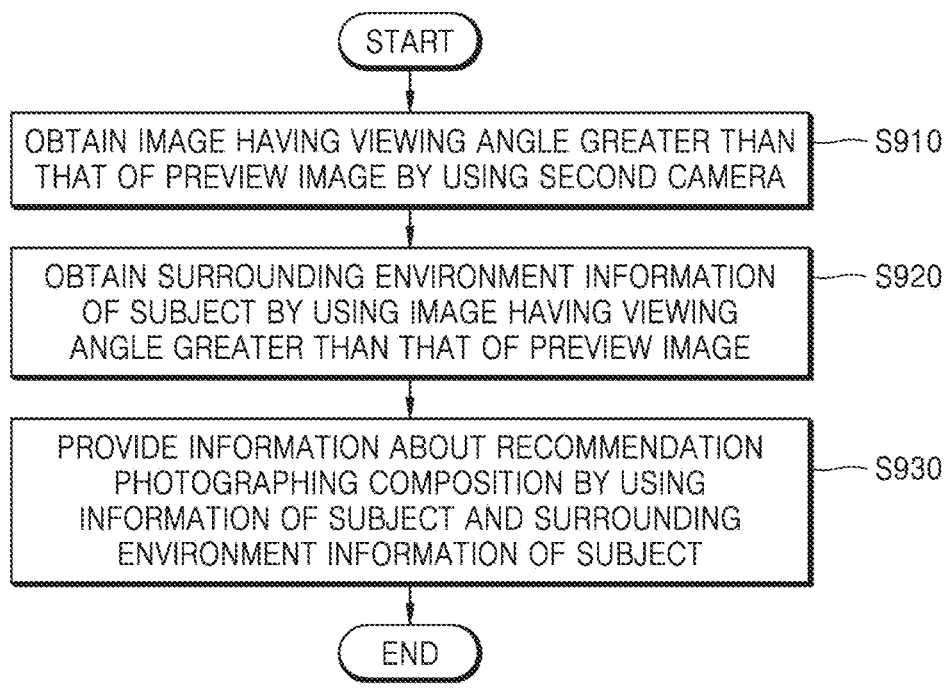
FIG. 9 is a flowchart for describing a method of providing information about a recommended photographing composition by using an image having a viewing angle greater than that of a preview image, according to an embodiment of the disclosure.

FIG. 9 is a flowchart for describing a method of providing information about a recommended photographing composition by using an image having a viewing angle greater than that of a preview image according to an embodiment of the disclosure.

In operation S910, the electronic apparatus 1000 may obtain a preview image by using a first camera, and may obtain an image having a viewing angle greater than that of the preview image by using a second camera.

FIG. 10 is a view for describing use of dual cameras according to an embodiment of the disclosure.

According to an embodiment, the electronic apparatus 1000 may include dual cameras. For example, referring to 1010 of FIG. 10, a first camera 1001 may be a general camera and a second camera 1002 may be a telephoto camera. In this case, the electronic apparatus 1000 may obtain the preview image by using a standard lens of the general camera, and may obtain the image having a viewing angle greater than that of the preview image by zooming out a telephoto lens of the telephoto camera.

The standard lens is a lens reproducing a viewing angle of a camera that is similar to a viewing angle of a person. A lens having a focal length of 50 mm based on a 35 mm film camera is referred to as the standard lens. Since a viewing angle of the standard lens is generally the same as a viewing angle of a person, a natural photograph may be taken by using the standard lens.

The telephoto lens may refer to a lens having a focal length greater than that of the standard lens. Since the telephoto lens has a focal length greater than that of the standard lens, a viewing angle may be less than that of the standard lens. Accordingly, the electronic apparatus 1000 may obtain the image having a viewing angle greater than that of the preview image obtained by the standard lens, by zooming out the telephoto lens.

Referring to 1020 of FIG. 10, the first camera 1001 may be a general camera and the second camera 1002 may be a wide-angle camera. In this case, the electronic apparatus 1000 may obtain the preview image by using the standard lens of the general camera, and may obtain the image having a viewing angle greater than that of the preview image by using a wide-angle lens of the wide-angle camera. The wide-angle lens may refer to a lens having a focal length less than that of the standard lens. Since the wide-angle lens has a focal length less than that of the standard lens, a viewing angle may be greater than that of the standard lens. Accordingly, the electronic apparatus 1000 may obtain the image having a viewing angle greater than that of the preview image obtained by the standard lens by using the wide-angle lens.

Referring to 1030 of FIG. 10, the first camera 1001 and the second camera 1002 may be general cameras. In this case, the electronic apparatus 1000 may obtain the preview image by using the standard lens of the first camera 1001, and may obtain a panorama image having a viewing angle greater than that of the preview image by stitching images obtained by the first camera 1001 and the second camera 1002.

According to an embodiment, the image having a viewing angle greater than that of the preview image may be an image having a maximum viewing angle (hereinafter, referred to as a maximum viewing angle image) that may be obtained by the electronic apparatus 1000. For convenience of explanation, the following will be described on the assumption that the image having a viewing angle greater than that of the preview image is a maximum viewing angle image.

In operation S920, the electronic apparatus 1000 may obtain surrounding environment information of a subject by using the image having a viewing angle greater than that of the preview image.

According to an embodiment, the electronic apparatus 1000 may obtain the surrounding environment information of the subject by analyzing the maximum viewing angle image. In this case, according to an embodiment, the electronic apparatus 1000 may obtain the surrounding environment information of the subject from the maximum viewing angle image by using a learning network model of an AI system.

For example, the electronic apparatus 1000 may determine whether it is daytime or nighttime, a direction of light or an intensity of light, and a position of the sun by analyzing light and shade, a shadow, and the sun included in the maximum viewing angle image. Also, the electronic apparatus 1000 may determine whether a season is spring, summer, autumn, or winter or may determine whether a location is indoors or outdoors by analyzing the subject included in the maximum viewing angle image. For example, when the electronic apparatus 1000 may determine that a season is summer when the subject wears a short-sleeve shirt and may determine that a season is winter when the subject stands on snow. The electronic apparatus 1000 may determine an entire color temperature by analyzing the maximum viewing angle image.

In operation S930, the electronic apparatus 1000 may provide information about a recommended photographing composition by using information of the subject and the surrounding environment information.

According to an embodiment, the electronic apparatus 1000 may determine a current photographing composition by using the preview image. The electronic apparatus 1000 may determine the recommended photographing composition based on the information of the subject and the surrounding environment information of the subject. In this case, when a similarity between the current photographing composition and the recommended photographing composition is less than a threshold value, the electronic apparatus 1000 may provide the information about the recommended photographing composition.

According to an embodiment, the electronic apparatus 1000 may provide the information about the recommended photographing composition by outputting information for guiding the recommended photographing composition. In this case, the electronic apparatus 1000 may output the information for guiding the recommended photographing composition by using at least one of, but not limited to, a video signal, an audio signal, and a vibration signal. For example, the electronic apparatus 1000 may output a voice for guiding the recommended photographing composition. Also, the electronic apparatus 1000 may display a graphic indicator for guiding the recommended photographing composition on the image having a viewing angle greater than that of the preview image (e.g., the maximum viewing angle image).

Operation S930 corresponds to operations S230 and S240 of FIG. 2, and thus a detailed explanation thereof will not be given. An operation by which the electronic apparatus 1000 provides the information for guiding the recommended photographing composition by using the maximum viewing angle image will now be described in detail with reference to FIGS. 11 through 13.

Figure 11:
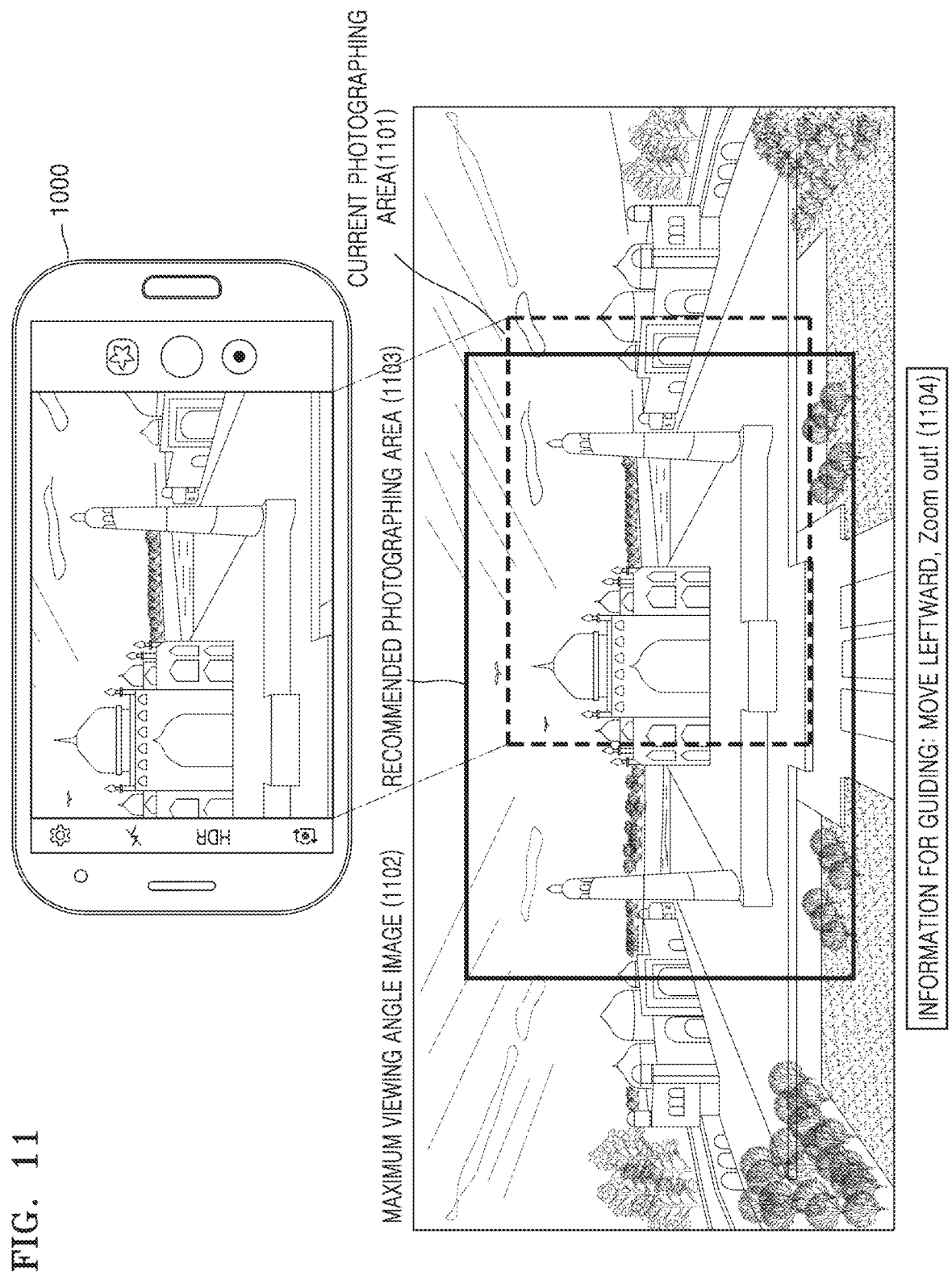
FIG. 11 is a view for describing an operation of guiding photographing by using a maximum viewing angle image, according to an embodiment of the disclosure.

FIG. 11 is a view for describing an operation of guiding photographing by using a maximum viewing angle image according to an embodiment of the disclosure.

Referring to FIG. 11, the electronic apparatus 1000 may obtain a preview image by using a standard lens. In this case, a current photographing area 1101 shown in the preview image may be a right area of the Taj Mahal.

The electronic apparatus 1000 may obtain a maximum viewing angle image 1102 by using a wide-angle lens, a telephoto lens, or two standard lenses. The maximum viewing angle image 1102 may include an image of surroundings of the current photographing area 1101.

The electronic apparatus 1000 may determine a recommended photographing composition by analyzing the maximum viewing angle image 1102. For example, the electronic apparatus 1000 may determine the recommended photographing composition as a triangular composition based on information of a subject (e.g., the Taj Mahal) and surrounding environment information (e.g., midday and outdoors), and may determine a recommendation photographing area 1103 as an area where the Taj Mahal is located at the center. In this case, according to an embodiment, the preview image (e.g., information about the current photographing area 1101) and the maximum viewing angle image 1102 may be input to the recommendation model 300, and an optimal photographing composition (e.g., information about the recommendation photographing area 1103) may be output from the recommendation model 300.

The electronic apparatus 1000 may output information 1104 for guiding photographing. For example, the electronic apparatus 1000 may output a voice message (e.g., "Move leftward, zoom out") to obtain a photograph corresponding to the recommendation photographing area 1103, instead of the current photographing area 1101.

The electronic apparatus 1000 may graphically display the information 1104 for guiding photographing, instead of the voice message. An operation by which the electronic apparatus 1000 graphically displays the information 1104 for guiding photographing will now be described with reference to FIGS. 12 and 15.

FIGS. 12 and 13 are views for describing an operation of displaying information for guiding a recommended photographing composition on a maximum viewing angle image according to various embodiments of the disclosure.

Referring to 1200-1 of FIG. 12, the electronic apparatus 1000 may display a preview image 1210 of an area (hereinafter, referred to as a current photographing area) currently photographed by a first camera. Also, the electronic apparatus 1000 may determine a recommendation photographing area by analyzing a maximum viewing angle image obtained by a second camera.

Referring to 1200-2 of FIG. 12, the electronic apparatus 1000 may provide information about the recommendation photographing area by using the maximum viewing angle image. For example, the electronic apparatus 1000 may display a maximum viewing angle image 1202 on a screen. The electronic apparatus 1000 may display a first indicator 1201 indicating the current photographing area and a second indicator 1203 indicating the recommendation photographing area on the maximum viewing angle image 1202. According to an embodiment, the preview image 1210 of the current photographing area may be displayed as a thumbnail image 1204.

Referring to 1300-1 of FIG. 13, a user may move the electronic apparatus 1000 while watching the screen of the electronic apparatus 1000 so that the first indicator 1201 indicating the current photographing area may approach the second indicator 1203 indicating the recommendation photographing area, and may adjust a zoom magnification. As the electronic apparatus 1000 moves and the zoom magnification is adjusted, a position of the first indicator 1201 indicating the current photographing area on the maximum viewing angle image 1202 may be changed. Also, as the current photographing area is changed, the thumbnail image 1204 may also be changed.

Referring to 1300-2 of FIG. 13, when the first indicator 1201 indicating the current photographing area is the same as the second indicator 1203 indicating the recommendation photographing area, the electronic apparatus 1000 may no longer display the maximum viewing angle image 1202, and may display a preview image 1301 of the current photographing area that is the same as the recommendation photographing area on the entire screen. The user may check the preview image 1301 and may select a photographing button. In this case, the electronic apparatus 1000 may obtain a photograph of the recommendation photographing area.

According to another embodiment, when the first indicator 1201 indicating the current photographing area is the same as the second indicator 1203 indicating the recommendation photographing area, the electronic apparatus 1000 may automatically perform photographing.

Although the electronic apparatus 1000 displays information for guiding the recommended photographing composition on the maximum viewing angle image 1202 in FIGS. 12 and 13, the disclosure is not limited thereto. The electronic apparatus 1000 may display the information for guiding the recommended photographing composition in any of various ways. An operation by which the electronic apparatus 1000 displays the information for guiding the recommended photographing composition will now be described with reference to FIGS. 14 and 15.

Figure 14:
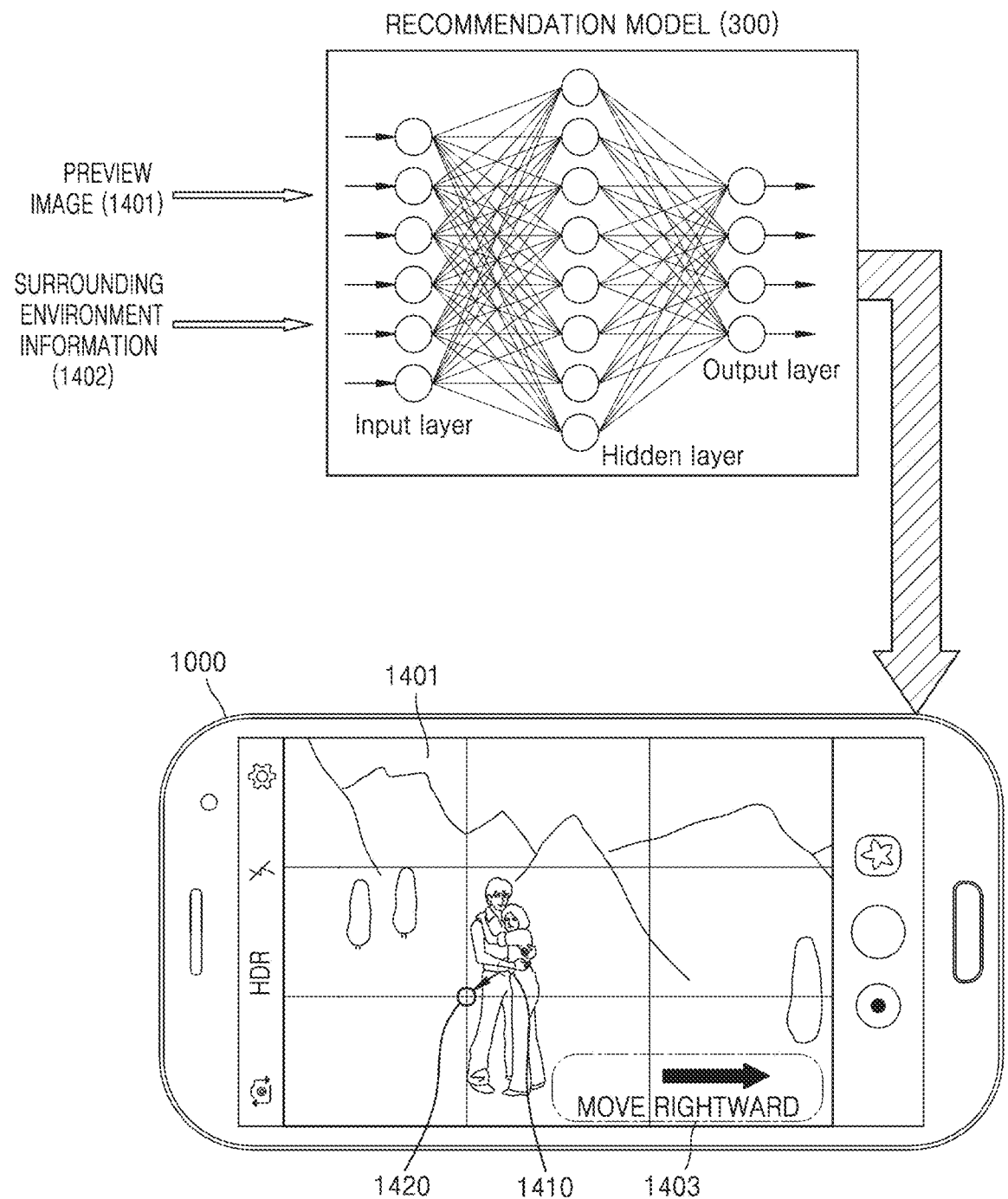

FIGS. 14 and 15 are views for describing an operation by which the electronic apparatus 1000 displays information about a recommended photographing composition according to various embodiments of the disclosure.

Referring to FIG. 14, the electronic apparatus 1000 may obtain a preview image 1401 and surrounding environment information 1402 of surroundings of a subject included in the preview image 1401. In this case, the electronic apparatus 1000 may determine a recommended photographing composition by using the recommendation model 300. For example, when the subject is a couple, a photographing place is outdoors, and a photographing time is midday, the electronic apparatus 1000 may determine a composition where a center 1410 of the couple is located at a lower left intersection 1420 of a rule-of-thirds composition as the recommended photographing composition.

In this case, the electronic apparatus 1000 may display a graphic indicator 1403 for guiding the recommended photographing composition on the preview image 1401. For example, the electronic apparatus 1000 may display a rightwards arrow along with text telling a photographer 'Move rightward' on the preview image 1401.

Referring to FIG. 15, when the subject is a person, the electronic apparatus 1000 may provide a guide for causing the photographer to move to the photographer, and may provide a guide for moving the subject. The following will be described on the assumption that the electronic apparatus 1000 determines a composition where a center 1520 of the couple is located at a first intersection 1521 that is a lower left intersection of a rule-of-thirds composition as the recommended photographing composition.

Referring to 1500-1 of FIG. 15, the electronic apparatus 1000 may provide a guide for causing the photographer to move rightward along with the electronic apparatus 1000 to the photographer by using camera icons 1501 so that the center 1520 of the couple (e.g., shown in the preview image 1510) is located at the first intersection 1521. For example, the electronic apparatus 1000 may display a white camera icon corresponding to a current photographing composition, may display a black camera icon corresponding to the recommended photographing composition, and then may display an arrow between the white camera icon and the black camera icon.

Referring to 1500-2 of FIG. 15, the electronic apparatus 1000 may provide a guide for moving the subject leftward by using person icons 1502 so that the center 1520 of the couple is located at the first intersection 1521. For example, the electronic apparatus 1000 may display a white person icon corresponding to the current photographing composition, may display a black person icon corresponding to the recommended photographing composition, and then may display an arrow between the white person icon and the black person icon.

Figure 16:
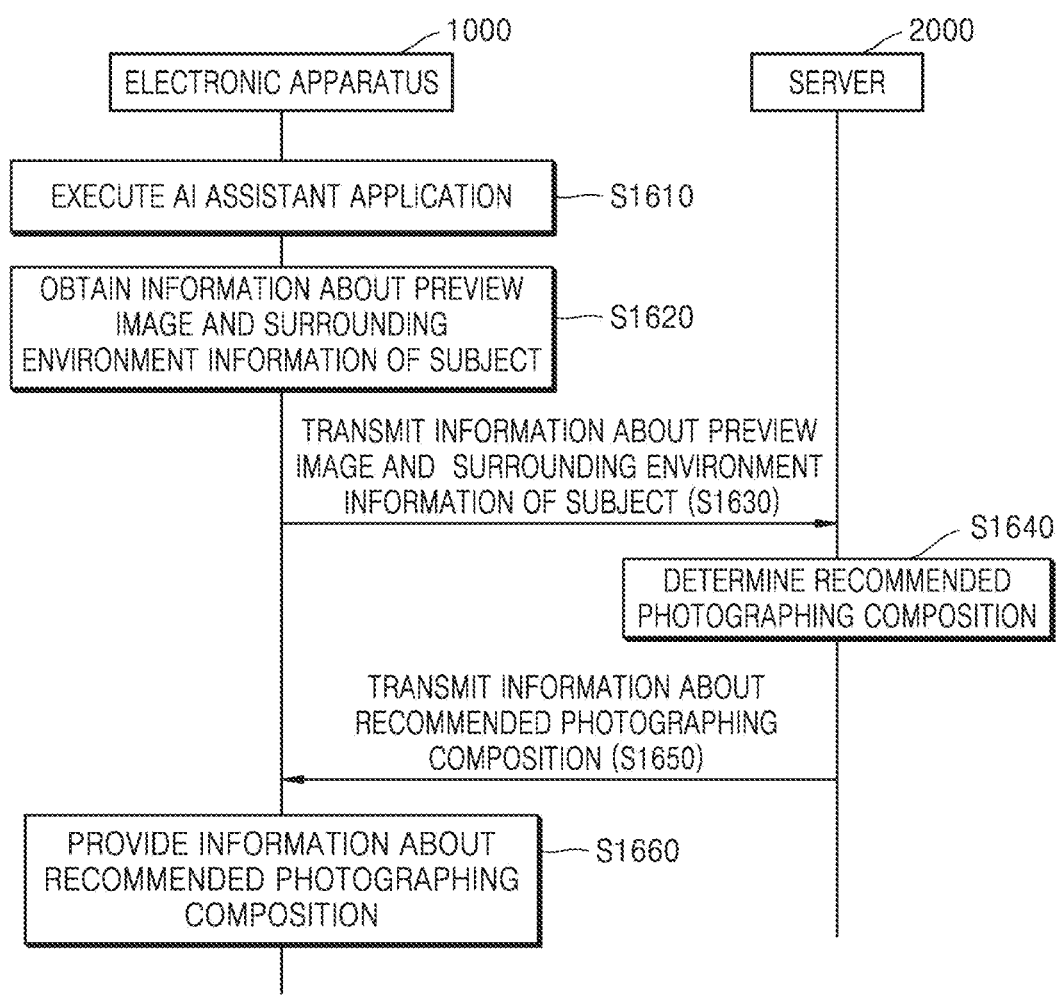
FIG. 16 is a flowchart for describing a method by which the electronic apparatus interoperates with a server to provide information about a recommended photographing composition, according to an embodiment of the disclosure.

FIG. 16 is a flowchart for describing a method by which the electronic apparatus 1000 interoperates with a server 2000 to provide information about a recommended photographing composition according to an embodiment of the disclosure.

In operation S1610, the electronic apparatus 1000 may execute an AI assistant application. The AI assistant application may understood all input methods such as a user's voice and touch, and a camera and may provide various services. For example, the AI assistant application (e.g., Bixby of Samsung) may recognize an object, an image, text, a barcode, etc. input to the camera and may provide information about a recommended photographing composition.

Referring to FIG. 17, the electronic apparatus 1000 may execute the AI assistant application in response to various user inputs. For example, referring to 1700-1 of FIG. 17, the electronic apparatus 1000 may display an image 1701 for executing the AI assistant application on a preview image 1710. When the user selects (e.g., touches) the image 1701, the electronic apparatus 1000 may execute the AI assistant application.

Referring to 1700-2 of FIG. 17, the electronic apparatus 1000 may receive the user's voice input (e.g., "Bixby! Take a photograph") 1702. In this case, the electronic apparatus 1000 may execute the AI assistant application according to the user's voice input 1702.

Referring to 1700-3 of FIG. 17, the electronic apparatus 1000 may receive an input that selects a specific hardware button 1703 for requesting to execute the AI assistant application. When the input that selects the specific hardware button 1703 is received, the electronic apparatus 1000 may execute the AI assistant application.

Referring back to FIG. 16, in operation S1620, the electronic apparatus 1000 may obtain information about a preview image and surrounding environment information of a subject through the AI assistant application.

According to an embodiment, the information about the preview image may be the preview image itself, or may be feature information obtained from the preview image. According to an embodiment, the AI assistant application may extract the feature information from the preview image by using a learning network model. For example, the feature information obtained from the preview image may include, but is not limited to, a current photographing composition of the preview image, a type of the subject, and a position of the subject.

According to an embodiment, the AI assistant application may obtain the surrounding environment information of the subject by analyzing the preview image. In this case, according to an embodiment, the AI assistant application may obtain the surrounding environment information of the subject from the preview image by using the learning network model.

According to an embodiment, the AI assistant application may obtain the surrounding environment information of the subject by using at least one sensor. For example, the AI assistant application may obtain information about a current position of the subject and whether the subject is located indoors or outdoors by using a position sensor. The AI assistant application may obtain an illuminance value of surroundings of the subject by using an illuminance sensor. Also, the AI assistant application may determine whether the surroundings of the subject are currently in daytime or nighttime by using the illuminance sensor. The AI assistant application may obtain temperature information of the surroundings of the subject by using a temperature sensor, and may obtain humidity information of the surroundings of the subject by using a humidity sensor. The AI assistant application may obtain the surrounding environment information by using a plurality of image sensors (or a plurality of cameras).

In operation S1630, the electronic apparatus 1000 may transmit the information about the preview image and the surrounding environment information of the subject to the server 2000. For example, the AI assistant application may transmit the information about the preview image and the surrounding environment information of the subject to the server 2000 through wired/wireless communication.

In operation S1640, the server 2000 may determine a recommended photographing composition based on the information about the preview image and the surrounding environment information of the subject. According to an embodiment, the server 2000 may determine the recommended photographing composition by using the learning network model (e.g., the recommendation model 300) trained based on photographs taken by professionals.

According to an embodiment, the server 2000 may determine the recommended photographing composition according to information of the subject (e.g., a type of the identified subject and the number of subjects) and the surrounding environment information (e.g., whether a photographing place is indoors or outdoors, a direction of light, an intensity of light, or a color temperature). For example, when the subject is several people and there is a sunset outdoors as a result obtained by analyzing the information of the subject and the surrounding environment information, the server 2000 may determine a composition where the several people are clearly shown on a frame when there is a sunset outdoors as the recommended photographing composition.

According to an embodiment, when the identified subject is a tall building and a characteristic subject does not exist in the surroundings as an analysis result based on a maximum viewing angle image, the server 2000 may determine a vertical mode as the recommended photographing composition. Also, when the subject is several people and the people stand on a wide lawn outdoors as an analysis result based on the maximum viewing angle image, the server 2000 may determine a horizontal mode as the recommended photographing composition.

According to an embodiment, the server 2000 may determine the recommended photographing composition in consideration of a photographing area and a photographing angle. Accordingly, the server 2000 may determine a recommendation photographing area and a recommendation photographing angle.

A method by which the server 2000 determines the recommended photographing composition based on the information of the subject and the surrounding environment information may correspond to a method by which the electronic apparatus 1000 determines the recommended photographing composition based on the information of the subject and the surrounding environment information, and thus a detailed explanation thereof will not be given.

In operation S1650, the server 2000 may transmit information about the recommended photographing composition to the electronic apparatus 1000. For example, the server 2000 may transmit the recommendation photographing area, the recommendation photographing angle, and the recommended photographing composition to the electronic apparatus 1000 through wired/wireless communication. According to an embodiment, the electronic apparatus 1000 may receive the information about the recommended photographing composition from the server 2000 through the AI assistant application.

In operation S1660, the electronic apparatus 1000 may provide the information about the recommended photographing composition through the AI assistant application.

According to an embodiment, the electronic apparatus 1000 may determine the current photographing composition by using the preview image. In this case, when a similarity between the current photographing composition and the recommended photographing composition is less than a threshold value, the electronic apparatus 1000 may provide the information about the recommended photographing composition.

According to an embodiment, the electronic apparatus 1000 may provide the information about the recommended photographing composition by outputting information for guiding the recommended photographing composition. In this case, the electronic apparatus 1000 may output the information for guiding the recommended photographing composition by using at least one of, but not limited to, a video signal, an audio signal, and a vibration signal. For example, the electronic apparatus 1000 may output a voice for guiding the recommended photographing composition. Also, the electronic apparatus 1000 may display a graphic indicator for guiding the recommended photographing composition on an image having a viewing angle (e.g., the maximum viewing angle image) greater than that of the preview image.

Although the server 2000 determines the recommended photographing composition based on the information of the subject and the surrounding environment information of the subject in FIG. 16, the disclosure is not limited thereto. According to an embodiment, the server 2000 may determine a recommendation photographing setting value based on the information of the subject and the surrounding environment information of the subject and may transmit information about the recommendation photographing setting value to the electronic apparatus 1000.

Some operations of FIG. 16 may be omitted. For example, the electronic apparatus 1000 may transmit only the information about the preview image, without transmitting the surrounding environment information of the subject, to the server 2000. In this case, the server 2000 may directly obtain the surrounding environment information of the subject based on the information about the preview image.

Figure 18:
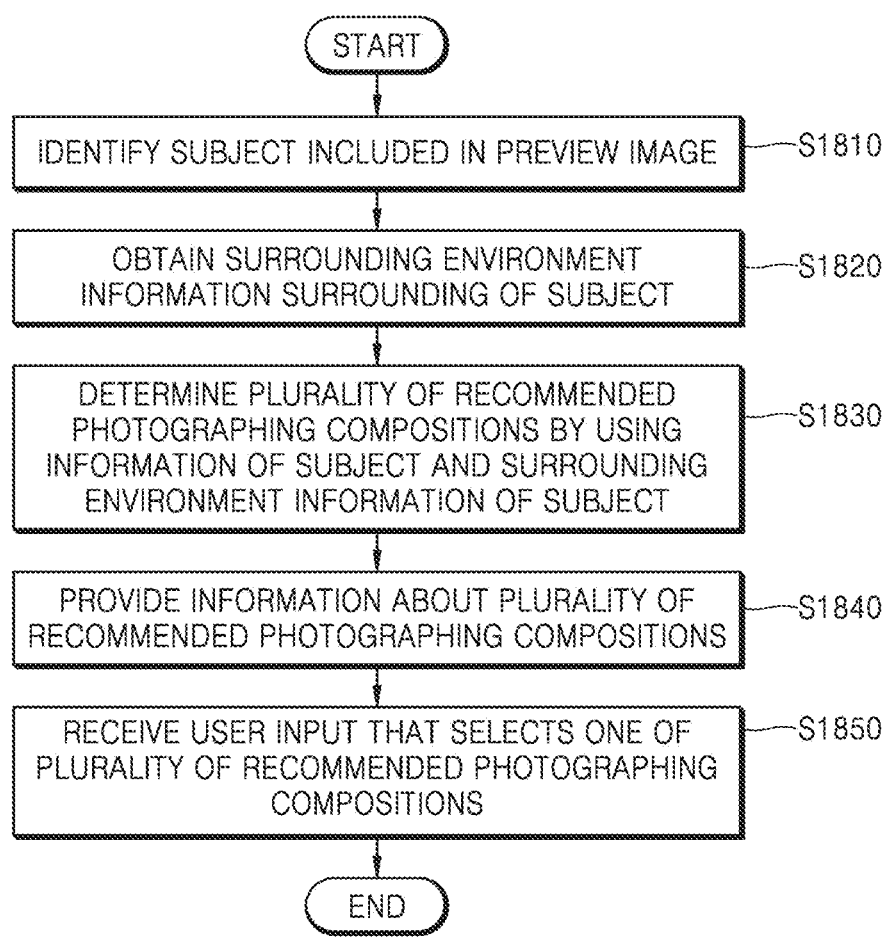
FIG. 18 is a flowchart for describing a method of providing information about a plurality of recommended photographing compositions, according to an embodiment of the disclosure.

FIG. 18 is a flowchart for describing a method of providing information about a plurality of recommended photographing compositions according to an embodiment of the disclosure.

In operation S1810, the electronic apparatus 1000 may identify a subject included in a preview image. For example, the electronic apparatus 1000 may identify the subject included in the preview image by analyzing the preview image. In this case, according to an embodiment, the electronic apparatus 1000 may identify the subject included in the preview image by using a learning network model (e.g., an AI model) of an AI system. Operation S1810 corresponds to operation S210 of FIG. 2, and thus a detailed explanation thereof will not be given.

In operation S1820, the electronic apparatus 1000 may obtain surrounding environment information of the subject. For example, the electronic apparatus 1000 may obtain information related to light in surroundings of the subject as the surrounding environment information.

According to an embodiment, the electronic apparatus 1000 may obtain the surrounding environment information of the subject by analyzing the preview image. In this case, according to an embodiment, the electronic apparatus 1000 may obtain the surrounding environment information of the subject from the preview image by using the learning network model of the AI system.

According to an embodiment, the electronic apparatus 1000 may obtain the surrounding environment information of the subject by using at least one sensor. For example, the electronic apparatus 1000 may obtain information about a current position of the subject and whether the subject is located indoors or outdoors by using a position sensor. The electronic apparatus 1000 may obtain an illuminance value of the surroundings of the subject by using an illuminance sensor. Also, the electronic apparatus 1000 may determine whether the surroundings of the subject are currently in daytime or nighttime by using the illuminance sensor. The electronic apparatus 1000 may obtain temperature information of the surroundings of the subject by using a temperature sensor, and may obtain humidity information of the surroundings of the subject by using a humidity sensor. The electronic apparatus 1000 may obtain the surrounding environment information by using a plurality of image sensors (or a plurality of cameras). Operation S1820 corresponds to operation S220 of FIG. 2, and thus a detailed explanation thereof will not be given.

In operation S1830, the electronic apparatus 1000 may determine a plurality of recommended photographing compositions by using information of the subject and the surrounding environment information of the subject. According to an embodiment, the electronic apparatus 1000 may determine the plurality of recommended photographing compositions by using the learning network model (e.g., the recommendation model 300) trained based on photographs taken by professionals.

According to an embodiment, the server 2000 may determine the plurality of recommended photographing compositions according to the information of the subject (e.g., a type of the identified subject and the number of subjects) and the surrounding environment information (e.g., whether a photographing place is outdoors or indoors, a direction of light, an intensity of light, and a color temperature).

In operation S1840, the electronic apparatus 1000 may provide information about the plurality of recommended photographing compositions.

According to an embodiment, the electronic apparatus 1000 may provide the information about the plurality of recommended photographing compositions by outputting information for guiding the plurality of recommended photographing compositions. In this case, the electronic apparatus 1000 may output the information for guiding the plurality of recommended photographing compositions by using at least one of, but not limited to, a video signal, an audio signal, and a vibration signal. For example, the electronic apparatus 1000 may output a voice for guiding the plurality of recommended photographing compositions. Also, the electronic apparatus 1000 may display a plurality of graphic indicators for guiding the plurality of recommended photographing compositions on the preview image. The electronic apparatus 1000 may display the plurality of graphic indicators (e.g., box images) for guiding the plurality of recommended photographing compositions on an image having a viewing angle (e.g., a maximum viewing angle image) greater than that of the preview image.

According to an embodiment, the electronic apparatus 1000 may display thumbnail images respectively corresponding to the plurality of recommended photographing compositions on one screen. According to another embodiment, the electronic apparatus 1000 may display preview images respectively corresponding to the plurality of recommended photographing compositions on different pages.

In operation S1850, the electronic apparatus 1000 may receive a user input that selects one of the plurality of recommended photographing compositions. According to an embodiment, the electronic apparatus 1000 may obtain a photograph image corresponding to the recommended photographing composition selected by a user.

For example, the electronic apparatus 1000 may receive an input that matches a first indicator corresponding to a current photographing composition to a second indicator corresponding to a second recommended photographing composition from among the plurality of recommended photographing compositions. In this case, the electronic apparatus 1000 may start photographing and may obtain a photograph image corresponding to the second recommended photographing composition.

According to an embodiment, the electronic apparatus 1000 may obtain a photograph image corresponding to the recommended photographing composition selected by the user. An operation by which the electronic apparatus 1000 provides the information about the plurality of recommended photographing compositions will now be described with reference to FIGS. 19 through 21.

Figure 19:
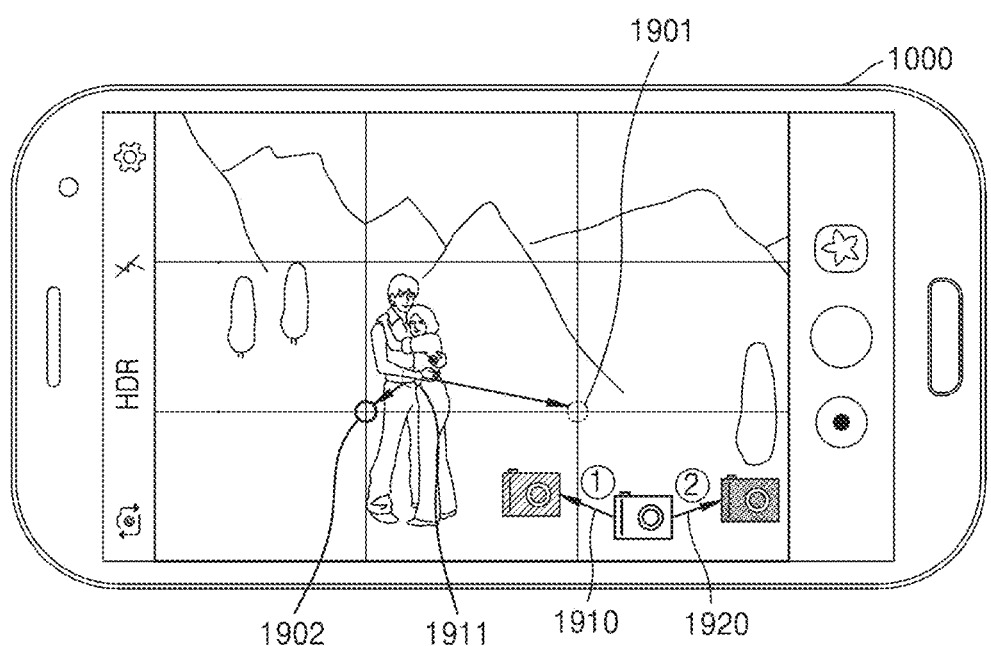
Figure 21:
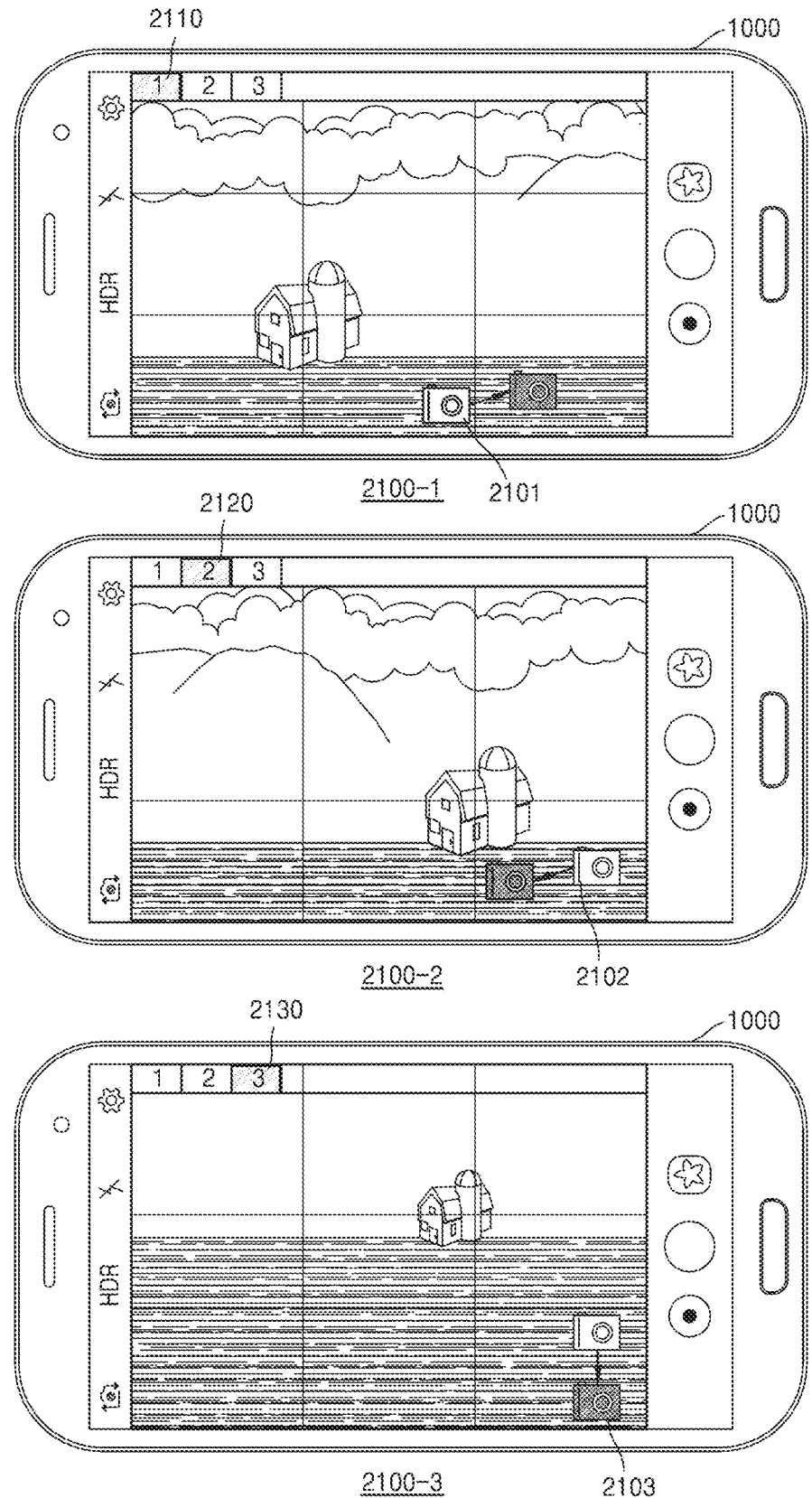

FIGS. 19, 20, and 21 are views for describing an operation by which the electronic apparatus 1000 displays information about a plurality of recommended photographing compositions according to various embodiments of the disclosure.

Referring to FIG. 19, the electronic apparatus 1000 may determine a plurality of recommended photographing compositions, and may display graphic indicators for guiding the plurality of recommended photographing compositions on a preview image.

According to an embodiment, the electronic apparatus 1000 may display the preview image obtained by a first camera on a screen. In this case, the preview image may include a couple as a subject and may include a field and a mountain as a background.

The electronic apparatus 1000 may determine a rule-of-thirds composition as a recommended photographing composition. In particular, the electronic apparatus 1000 may determine a composition where a center 1911 of the subject is located at a first point 1901 as a first recommended photographing composition and a composition where a center 1911 of the subject is located at a second point 1902 as a second recommended photographing composition, from among virtual points where horizontal/vertical lines meet, in consideration of information of the subject and surrounding environment information.

The electronic apparatus 1000 may display a first indicator 1910 for guiding the first recommended photographing composition and a second indicator 1920 for guiding the second recommended photographing composition on the preview image. For example, the first indicator 1910 may include an icon (e.g., a leftwards arrow) for guiding a photographer to move leftward. The second indicator 1920 may include an icon (e.g., a rightwards arrow) for guiding the photographer to move rightward.

Referring to FIG. 20, the electronic apparatus 1000 may display thumbnail images respectively corresponding to a plurality of photographing compositions on a screen.

Referring to 2000-1 of FIG. 20, the electronic apparatus 1000 may display an icon 2001 for requesting for a recommended photographing composition on a preview image 2010 obtained by a first camera. The electronic apparatus 1000 may receive a user input that selects the icon 2001 for requesting for the recommended photographing composition. For example, when a user (photographer) wants to obtain information about the recommended photographing composition, the user may touch the icon 2001 displayed on the preview image 2010.

Referring to 2000-2 of FIG. 20, the electronic apparatus 1000 may determine a plurality of recommended photographing compositions in response to an input that touches the icon 2001. In this case, the electronic apparatus 1000 may display thumbnail images corresponding to the plurality of recommended photographing compositions.

For example, the electronic apparatus 1000 may determine a rule-of-thirds composition as the recommended photographing composition. In particular, the electronic apparatus 1000 may determine a composition where a center of a subject is located at the first point 1901 as a first recommended photographing composition, may determine a composition where the center of the subject is located at a second point as a second recommended photographing composition, and may determine a composition where the center of the subject is located at a third point as a third recommended photographing composition, from among virtual points where horizontal/vertical lines meet, in consideration of information of the subject and surrounding environment information.

In this case, the electronic apparatus 1000 may obtain thumbnail images corresponding to the recommended photographing compositions from a maximum viewing angle image obtained by a second camera. For example, the electronic apparatus 1000 may obtain a first thumbnail image 2003 corresponding to the first recommended photographing composition, a second thumbnail image 2004 corresponding to the second recommended photographing composition, and a third thumbnail image 2005 corresponding to the third recommended photographing composition from the maximum viewing angle image.

The electronic apparatus 1000 may display the first thumbnail image 2003 corresponding to the first recommended photographing composition, the second thumbnail image 2004 corresponding to the second recommended photographing composition, and the third thumbnail image 2005 corresponding to the third recommended photographing composition on the screen along with a thumbnail image 2002 corresponding to the preview image 2010. In this case, since the user (photographer) may check photograph images according to the plurality of recommended photographing compositions and a photograph image according to a current photographing composition in advance, the user may easily select a desired photographing composition.

Referring to FIG. 21, when a plurality of recommended photographing compositions are determined, the electronic apparatus 1000 may obtain preview images respectively corresponding to recommended photographing compositions on a maximum viewing angle image obtained by a second camera. The electronic apparatus 1000 may display the preview images respectively corresponding to the plurality of recommended photographing compositions on different pages.

Referring to 2100-1 of FIG. 21, the electronic apparatus 1000 may display a first preview image corresponding to a first recommended photographing composition on a first page 2110. In this case, the electronic apparatus 1000 may display a first indicator 2101 for guiding the first recommended photographing composition. For example, the first indicator 2101 may include an arrow for guiding a photographer to move rightward.

Referring to 2100-2 of FIG. 21, the electronic apparatus 1000 may display a second preview image corresponding to a second recommended photographing composition on a second page 2120. In this case, the electronic apparatus 1000 may display a second indicator 2102 for guiding the second recommended photographing composition. For example, the second indicator 2102 may include an arrow for guiding the photographer to move leftward.

Referring to 2100-3 of FIG. 21, the electronic apparatus 1000 may display a third preview image corresponding to a third recommended photographing composition on a third page 2130. In this case, the electronic apparatus 1000 may display a third indicator 2103 for guiding the third recommended photographing composition. For example, the third indicator 2103 may include an image for guiding the photographer to move downward the electronic apparatus 1000 and zoom out.

The user (photographer) may check preview images according to a plurality of recommended photographing compositions in advance, and may easily determine a desired photographing composition. Also, the user (photographer) may easily obtain a photograph of a desired photographing composition according to an indicator for guiding a recommended photographing composition.

A method by which the electronic apparatus 1000 recommends a pose when a subject is a person will now be described in detail with reference to FIGS. 22 through 26.

Figure 22:
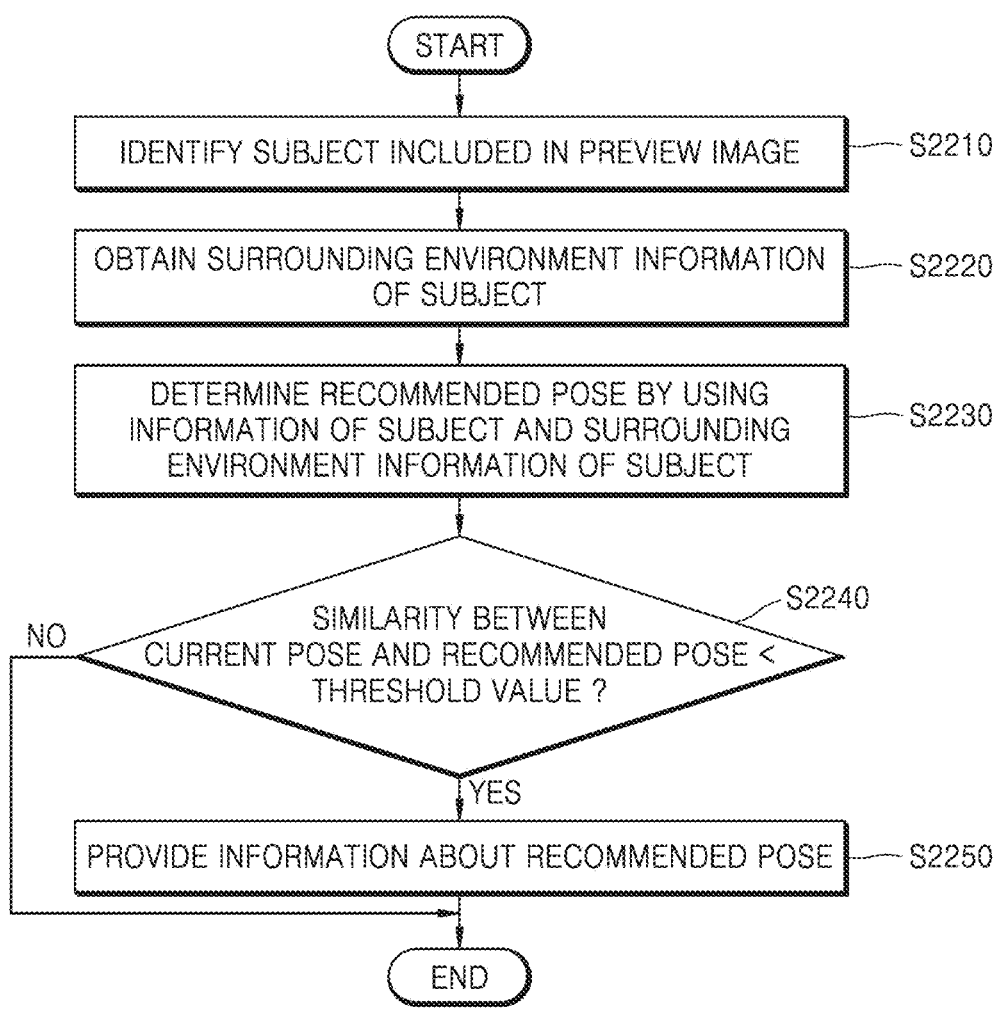
FIG. 22 is a flowchart for describing a method of providing information about a recommended pose, according to an embodiment of the disclosure.

FIG. 22 is a flowchart for describing a method of providing information about a recommended pose according to an embodiment of the disclosure.

In operation S2210, the electronic apparatus 1000 may identify a subject included in a preview image. For example, the electronic apparatus 1000 may identify the subject included in the preview image by analyzing the preview image. In this case, according to an embodiment, the electronic apparatus 1000 may identify the subject included in the preview image by using a learning network model of an AI system. Operation S2210 corresponds to operation S210 of FIG. 2, and thus a detailed explanation thereof will not be given.

In operation S2220, the electronic apparatus 1000 may obtain surrounding environment information of the subject.

According to an embodiment, the electronic apparatus 1000 may obtain the surrounding environment information of the subject by analyzing the preview image. In this case, according to an embodiment, the electronic apparatus 1000 may obtain the surrounding environment information of the subject from the preview image by using the learning network model of the AI system.

According to an embodiment, the electronic apparatus 1000 may obtain the surrounding environment information of the subject by using at least one sensor. For example, the electronic apparatus 1000 may obtain information about a current position of the subject and whether the subject is located indoors or outdoors by using a position sensor. The electronic apparatus 1000 may obtain an illuminance value of surroundings of the subject by using an illuminance sensor. Also, the electronic apparatus 1000 may determine whether the surroundings of the subject are currently in daytime or nighttime by using the illuminance sensor. The electronic apparatus 1000 may obtain temperature information of the surroundings of the subject by using a temperature sensor, and may obtain humidity information of the surroundings of the subject by using a humidity sensor. The electronic apparatus 1000 may obtain the surrounding environment information by using a plurality of image sensors (or a plurality of cameras). Operation S2220 corresponds to operation S220 of FIG. 2, and thus a detailed explanation thereof will not be given.

In operation S2230, the electronic apparatus 1000 may determine a recommended pose by using information of the subject and the surrounding environment information of the subject.

According to an embodiment, the electronic apparatus 1000 may determine the recommended pose by using the learning network model. The learning network model may be generated by using data obtained by learning a pose (recognition) of a person, a background, and presence of another person based on photographs of the person for learning. The recommended pose may include not only a whole-body pose of the person but also a facial expression or a face angle.

According to an embodiment, when the person's face is recognized through a first camera, the electronic apparatus 1000 may select a pose card suitable for a current surrounding environment of the subject form among a plurality of pose cards that are pre-generated. The electronic apparatus 1000 may determine a pose included in the selected pose card as the recommended pose.

According to an embodiment, the electronic apparatus 1000 may determine the recommended pose by further considering personalized learning data of a user. For example, when the electronic apparatus 1000 recommends a sitting pose, a standing pose, and a lying pose to a first user, but the user takes the sitting pose in all photographs, the electronic apparatus 1000 may determine the recommended pose based on the sitting pose. Also, when all of photographs where the user takes the lying pose are deleted, the electronic apparatus 1000 may not select the lying pose when determining the recommended pose.

According to an embodiment, the electronic apparatus 1000 may determine a plurality of recommended poses by using the information of the subject and the surrounding environment information of the subject. For example, when a plurality of subjects stand on a lawn, the electronic apparatus 1000 may recognize a plurality of people as subject information and may recognize outdoors, a lawn, and midday as surrounding environment information. In this case, the electronic apparatus 1000 may select a first pose card, a second pose card, and a third pose card related to photographs of the plurality of people standing on the lawn in midday from among a plurality of pose cards that are pre-generated.

In operation S2240, the electronic apparatus 1000 may compare a current pose with the recommended pose and may determine whether a similarity between the current pose and the recommended pose is less than a threshold value.

According to an embodiment, the electronic apparatus 1000 may determine a current pose of a person who is the subject by analyzing the preview image. According to an embodiment, the electronic apparatus 1000 may determine the current pose of the person who is the subject by using the learning network model of the AI system.

Examples of the pose may include, but are not limited to, a pose of lying to the left, a pose of lying to the right, a pose of sitting down with legs stretched out, a pose of sitting down with knees bent and sitting down, a pose of bending the waist, a pose of raising hands on the waist, a pose of standing while looking forward, a pose of standing while looking at the side, a pose of standing with his/her back, and a pose of jumping.

According to an embodiment, examples of the pose may further include, but are not limited to, a shape of a finger (e.g., a V-shape, a heart shape, a fisted shape, or a thumbs up shape), a facial expression (e.g., no expression, a smiling expression, a crying expression, or a frowning expression), and whether accessories are worn (e.g., whether glasses are worn, whether sunglasses are worn, or whether a hat is worn).

According to an embodiment, the electronic apparatus 1000 may compare the current pose with the recommended pose. If a similarity between the current pose and the recommended pose is equal to or greater than a threshold value (e.g., 97%), the electronic apparatus 1000 may not provide information about the recommended pose.

In operation S2250, the electronic apparatus 1000 may provide the information about the recommended pose when the similarity between the current pose and the recommended pose is less than the threshold value.

According to an embodiment, the electronic apparatus 1000 may output information for guiding the recommended pose. For example, the electronic apparatus 1000 may output the information for guiding the recommended pose by using at least one of, but not limited to, a video signal, an audio signal, and a vibration signal.

According to an embodiment, the electronic apparatus 1000 may display a line for guiding the recommended pose on the subject. According to an embodiment, the electronic apparatus 1000 may display a graphic indictor (e.g., an icon) for guiding the recommended pose on a portion of the preview image (e.g., an upper right portion).

According to an embodiment, the electronic apparatus 1000 may provide a plurality of recommended pose cards to a predetermined portion when a plurality of recommended poses are determined.

An operation by which the electronic apparatus 1000 provides the information about the recommended pose will now be described with reference to FIGS. 23 through 26.

Figure 23:
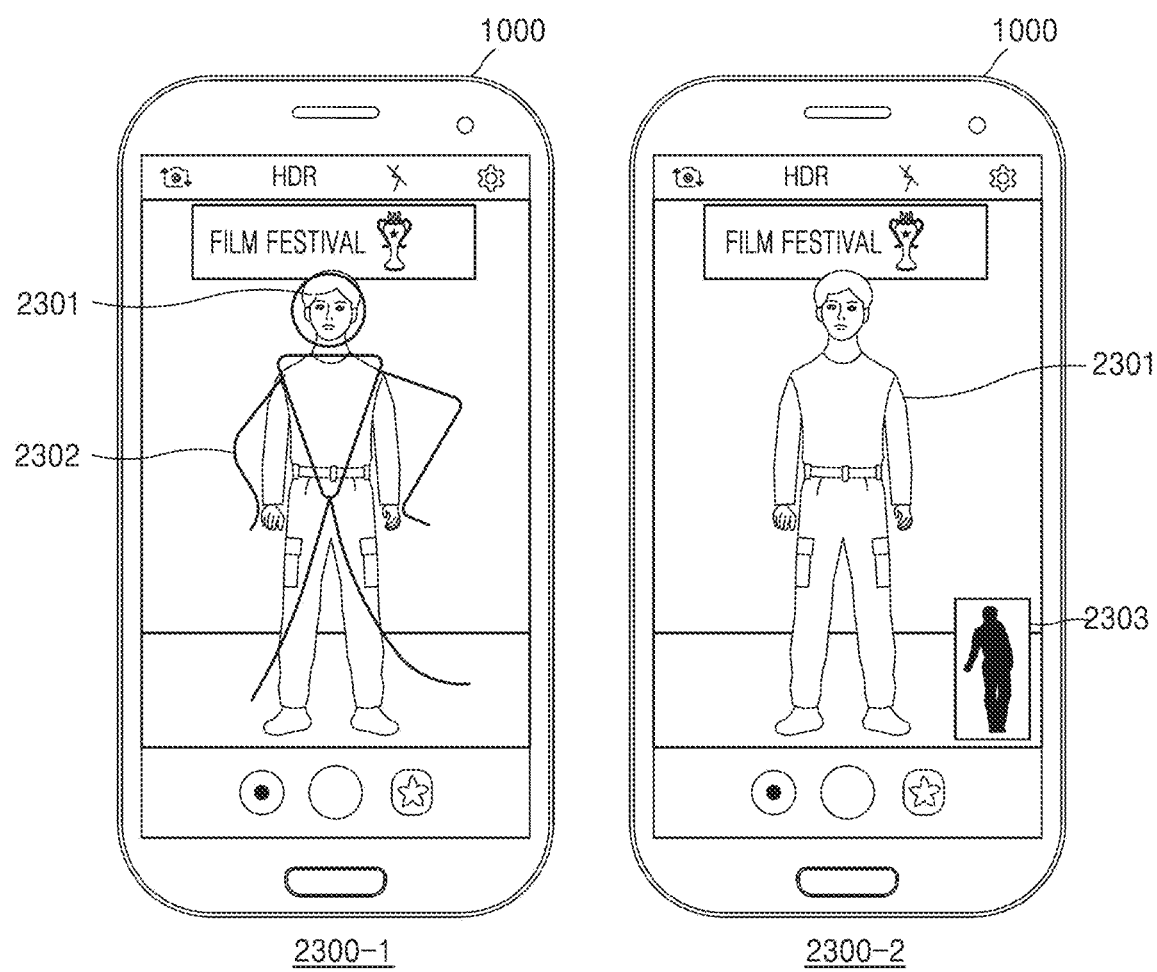
FIG. 23 is a view for describing an operation by which the electronic apparatus displays information about a recommended pose, according to an embodiment of the disclosure.

FIG. 23 is a view for describing an operation by which the electronic apparatus 1000 displays information about a recommended pose according to an embodiment of the disclosure.

Referring to FIG. 23, the electronic apparatus 1000 may analyze a preview image obtained by a first camera and may recognize that a main subject 2301 is one person and the main subject 2301 is awarded in a film festival (indoors) that is a surrounding environment. Also, the electronic apparatus 1000 may recognize that the main subject 2301 stands with a stiff look (a current pose). In this case, the electronic apparatus 1000 may determine a pose suitable for an awards ceremony hall (indoors) as a recommended pose. The electronic apparatus 1000 may display information about the recommended pose on a screen.

For example, referring to 2300-1 of FIG. 23, the electronic apparatus 1000 may determine a pose of raising hands on the waist as the recommended pose. The electronic apparatus 1000 may display lines 2302 for guiding the recommended pose so that the lines 2302 overlap an image of the main subject 2301. In this case, a photographer may check the recommended pose and may request the main subject 2301 to change a pose.

Referring to 2300-2 of FIG. 23, the electronic apparatus 1000 may display an icon corresponding to the recommended pose on a specific portion 2303 so that the icon does not overlap the image of the main subject 2301. In this case, the photographer may check the recommended pose displayed on the specific portion 2303.

FIG. 24 is a view for describing an operation of providing information about a recommended pose by using the number of subjects and surrounding environment information of the subjects according to an embodiment of the disclosure.

Referring to 2400-1 of FIG. 24, the electronic apparatus 1000 may obtain information indicating that the number of subjects is 3 by analyzing a preview image 2410. Also, the electronic apparatus 1000 may find that the three subjects currently exist in daytime outdoors by analyzing the preview image or by using a sensor. In this case, the electronic apparatus 1000 may determine a pose that may be taken by the three subjects in daytime outdoors as a recommended pose, by using the recommendation model 300. For example, the electronic apparatus 1000 may determine a pose where the three subjects raise their hands and give cheers as the recommended pose. The electronic apparatus 1000 may provide a graphic indicator for guiding the recommended pose. For example, the electronic apparatus 1000 may display an icon image 2401 corresponding to the recommended pose on the preview image.

Referring to 2400-2 of FIG. 24, the electronic apparatus 1000 may obtain information indicating that the number of subjects is 3 by analyzing a preview image 2420. Also, the electronic apparatus 1000 may find that the three subjects exist indoors by analyzing the preview image or by using a sensor. In this case, the electronic apparatus 1000 may determine a pose that may be taken by the three subjects standing indoors as a recommended pose. For example, the electronic apparatus 1000 may determine a pose where a middle subject among the three subjects sits down and two other subjects on both sides stand up as the recommended pose. The electronic apparatus 1000 may provide a graphic indicator for guiding the recommended pose. For example, the electronic apparatus 1000 may display an icon image 2402 corresponding to the recommended pose on the preview image.

Figure 25:
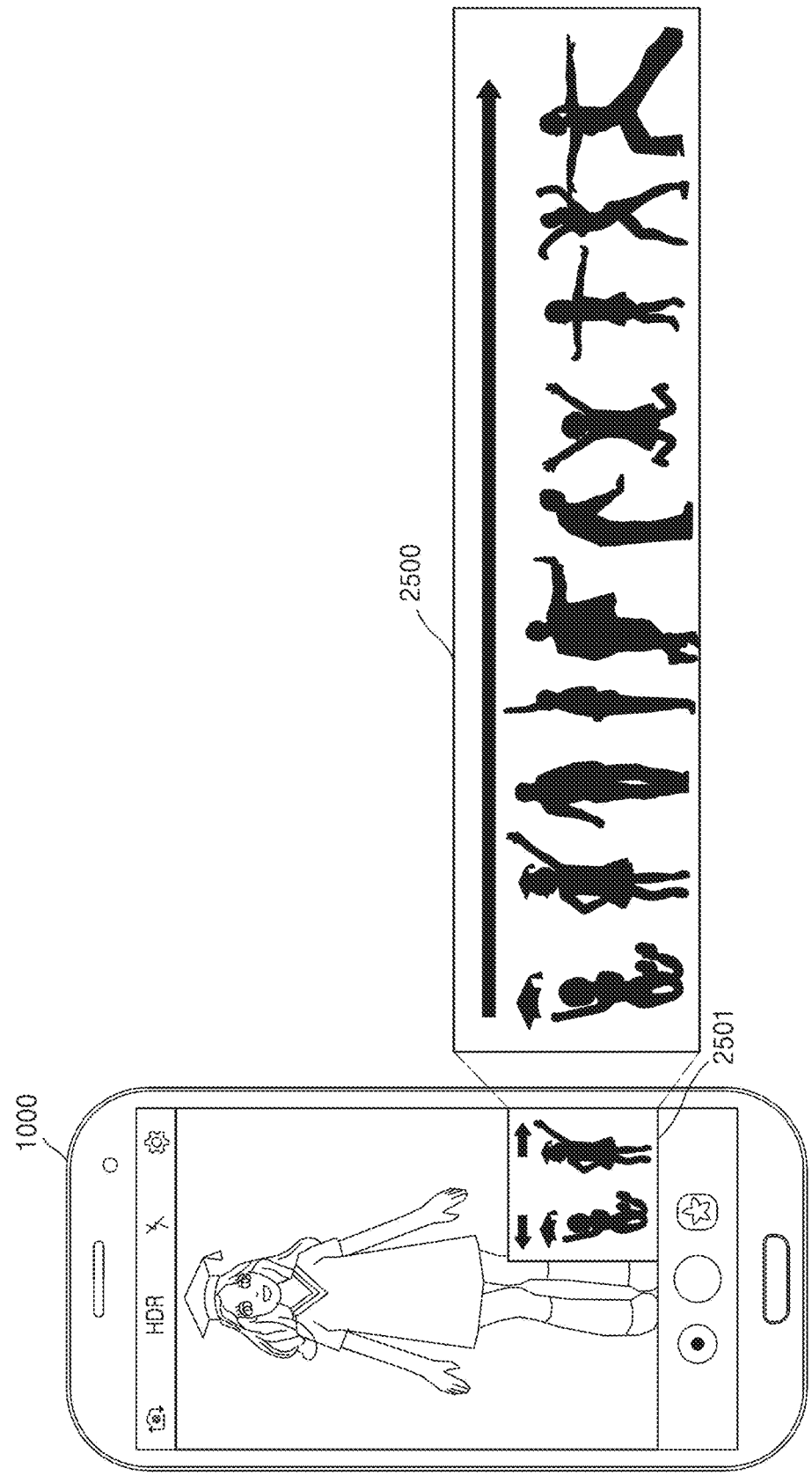
FIG. 25 is a view for describing an operation of providing information about a plurality of recommended poses, according to an embodiment of the disclosure.

FIG. 25 is a view for describing an operation of providing information about a plurality of recommended poses according to an embodiment of the disclosure.

Referring to FIG. 25, the electronic apparatus 1000 may obtain information indicating that the number of subjects is 1 and a place is a graduation ceremony hall by analyzing a preview image. In this case, the electronic apparatus 1000 may determine a pose that may be taken by the subject in the graduation ceremony hall as a recommended pose. For example, the electronic apparatus 1000 may determine various poses such as a pose of jumping and throwing a graduation cap, a pose of putting one hand on the waist and raising the other hand, or a pose of leaning against the wall as the recommended poses.

According to an embodiment, the electronic apparatus 1000 may display information (e.g., 2500) for guiding the plurality of recommended poses on a specific portion 2501 of the displayed information 2500. For example, the electronic apparatus 1000 may display icon images respectively corresponding to the plurality of recommended poses on the specific portion 2501.

When there are the plurality of recommended poses, the electronic apparatus 1000 may not display all icons indicating the plurality of recommended poses on the specific portion 2501. In this case, the electronic apparatus 1000 may indicate that there are more recommended poses other than those displayed on the specific portion 2501, by providing an arrow to the specific portion 2501. A user may check the other recommended poses not shown on the specific portion 2501 by touching the arrow or dragging his/her finger to the left or right within the specific portion 2501. For example, when a drag input is received in a state where a first icon (e.g., an icon corresponding to a pose of jumping) corresponding to a first recommended pose is displayed on the specific portion 2501, the electronic apparatus 1000 may display a second icon (e.g., a pose of standing with both hands on the waist) corresponding to a second recommended pose, instead of the first icon, on the specific portion 2501. A method by which the electronic apparatus 1000 provides information about the plurality of recommended poses is not limited to that of FIG. 25 and any of various other methods may be used.

Figure 26:
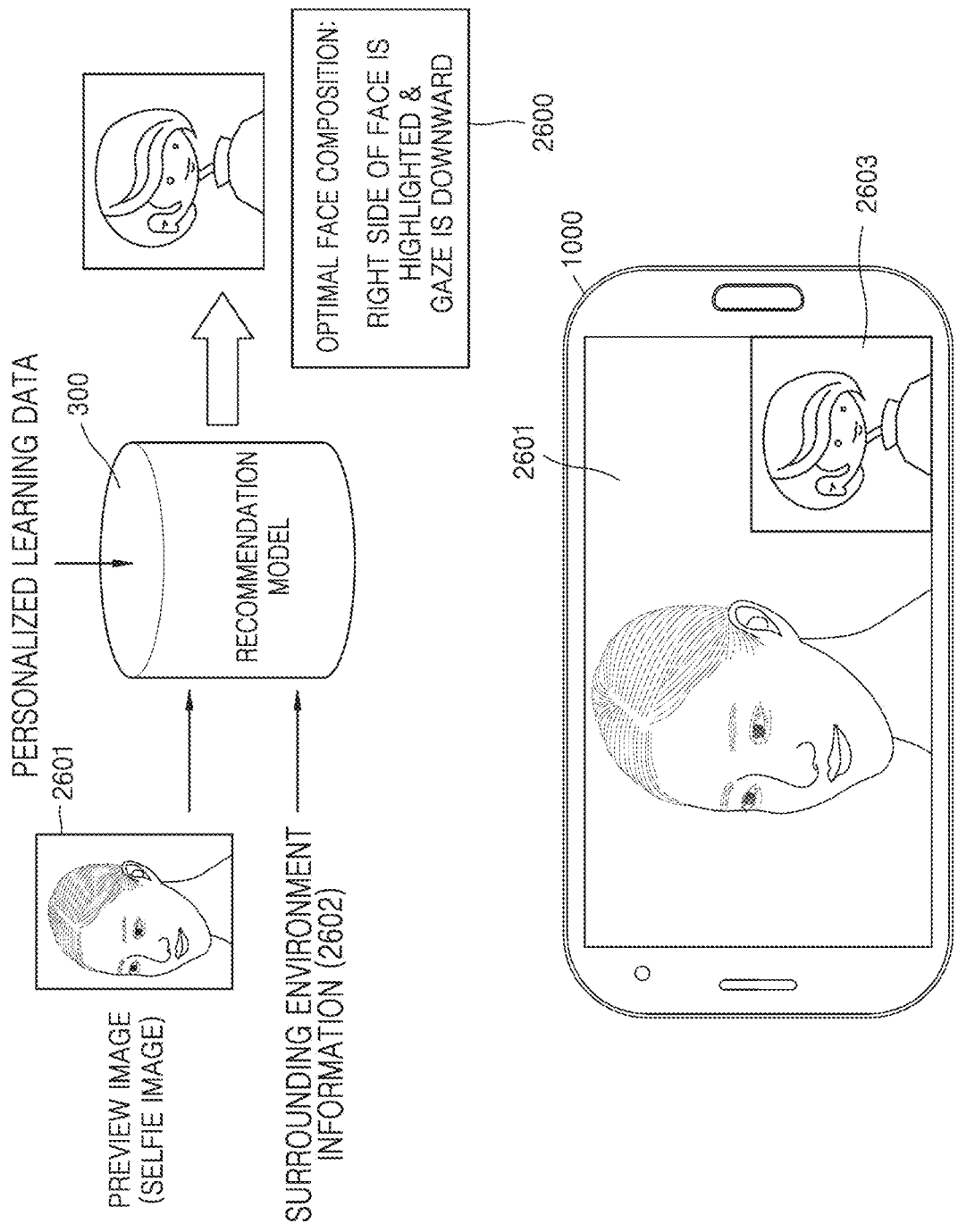
FIG. 26 is a view for describing an operation of recommending an optimal face composition, according to an embodiment of the disclosure.

FIG. 26 is a view for describing an operation of recommending an optimal face composition according to an embodiment of the disclosure. FIG. 26 will be described on the assumption that a user of the electronic apparatus 1000 takes a selfie image.

Referring to FIG. 26, the electronic apparatus 1000 may obtain a preview image including a user's face image. The electronic apparatus 1000 may obtain surrounding environment information (e.g., a direction of lighting or the impression of color of lighting) by analyzing the preview image or by using sensors. In this case, the electronic apparatus 1000 may input information about the user's face image and the surrounding environment information to the recommendation model 300. In this case, the electronic apparatus 1000 may obtain information about an optimal face composition 2600 from the recommendation model 300.

The recommendation model 300 may be a model trained by using personalized learning data. For example, the recommendation model 300 may be a model trained based on photographs usually uploaded to a social networking service (SNS) server and photographs deleted by the user from a memory after photographing. The recommendation model 300 may have information indicating that the user deletes photographs where the left side of the face is highlighted and uploads photograph where the right side of the face is highlighted to the SNS server.

Accordingly, when a preview image 2601 and surrounding environment information 2602 are input to the recommendation model 300, the recommendation model 300 may determine a recommendation face angle by using the personalized learning data. For example, the recommendation model 300 may determine a face composition where the right face of the face is highlighted and a gaze is downward as the recommendation face composition.

Since a current composition of the face included in the preview image is a composition where the left side is highlighted, the electronic apparatus 1000 may provide information about the recommendation face composition. For example, the electronic apparatus 1000 may display an icon image 2603 corresponding to the recommendation face composition on a screen. Also, the electronic apparatus 1000 may output a voice signal corresponding to the recommendation face composition. For example, the electronic apparatus 1000 may output a voice message saying that "You'd better turn your face in the opposite direction, tilt your chin down, and shift your gaze downward".

Figure 27:
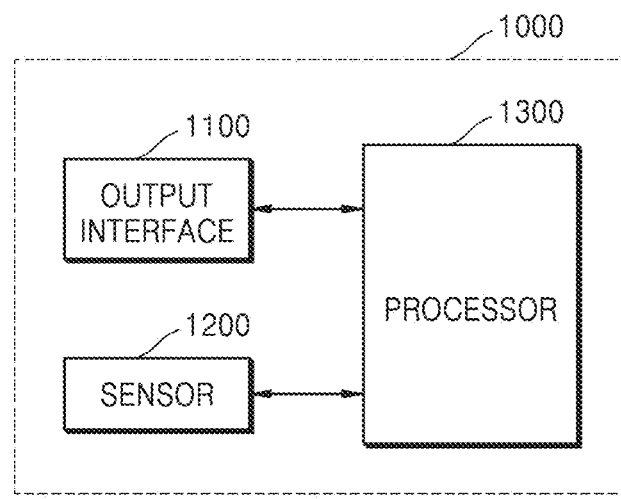
FIGS. 27 and 28 are block diagrams for describing the electronic apparatus according to various embodiments of the disclosure.
Figure 28:
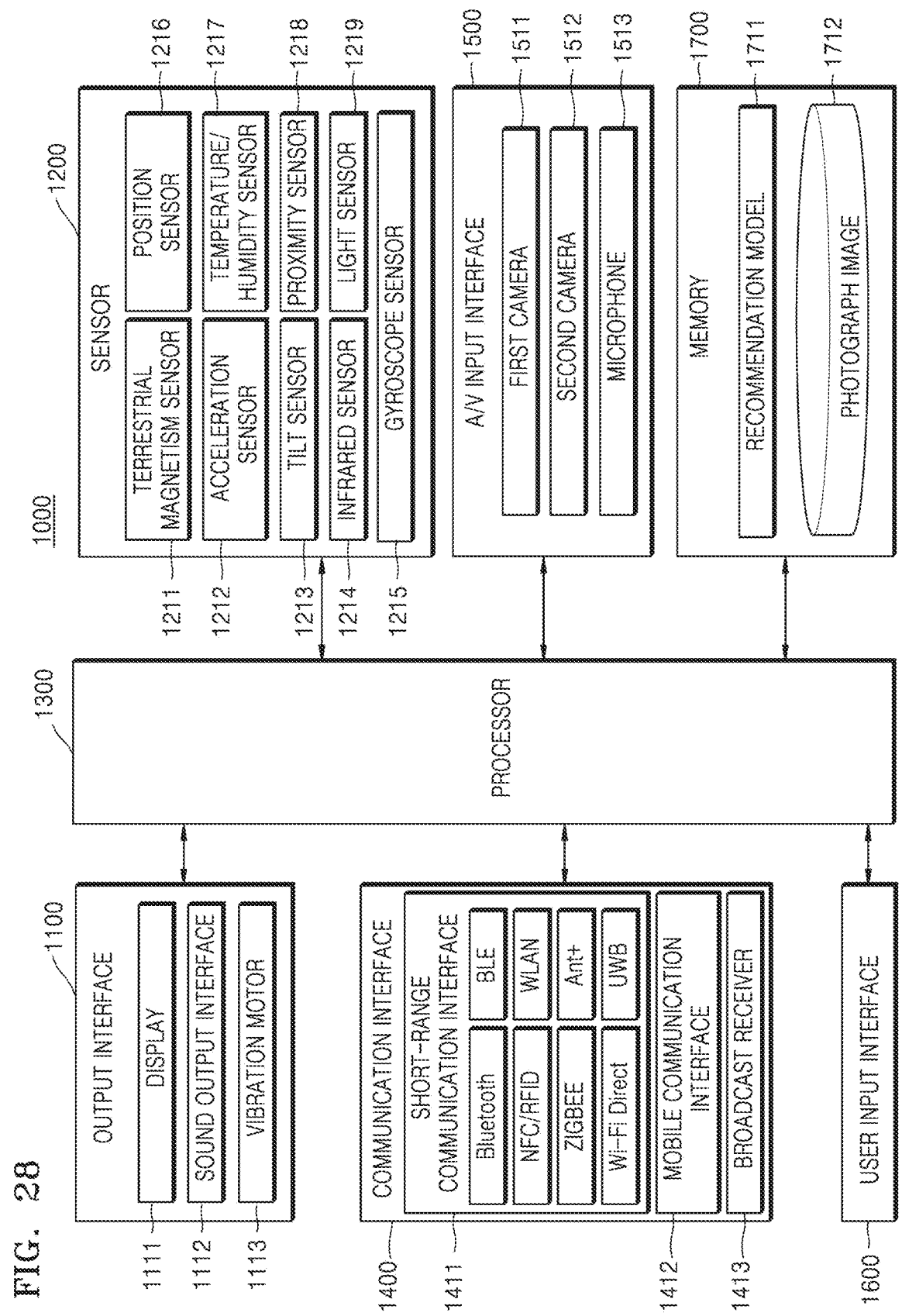

FIGS. 27 and 28 are block diagrams for describing the electronic apparatus 1000 according to various embodiments of the disclosure.

Referring to FIG. 27, the electronic apparatus 1000 according to an embodiment may include an output interface 1100, a sensor 1200, and a processor 1300. However, all elements illustrated in FIG. 27 are not essential elements. The electronic apparatus 1000 may include more or fewer than the elements illustrated in FIG. 27.

For example, as shown in FIG. 28, the electronic apparatus 1000 according to an embodiment may include a communication interface 1400, an A/V input interface 1500, a user input interface 1600, and a memory 1700 in addition to the output interface 1100, the sensor 1200, and the processor 1300.

The elements will be sequentially described below.

The output interface 1100 for outputting an audio signal, a video signal, or a vibration signal may include a display 1111, a sound output interface 1112, and a vibration motor 1113.

The sound output interface 1112 outputs audio data received from the communication interface 1400 or stored in the memory 1700. Also, the sound output interface 1112 outputs a sound signal related to a function (e.g., a call signal receiving sound, a message receiving sound, or a notification sound) performed by the electronic apparatus 1000. The sound output interface 1112 may include a speaker or a buzzer.

The vibration motor 1113 may output a vibration signal. For example, the vibration motor 1113 may output a vibration signal corresponding to an output of audio data or video data (e.g., a call signal receiving sound or a message receiving sound). Also, the vibration motor 1113 may output a vibration signal when a touch is input to a touchscreen. The vibration motor 1113 may output a vibration signal when a current position is the same as a recommendation composition when a photographer moves or a subject moves.

The output interface 1100 may display a preview image including the subject recognized by a first camera 1511. The output interface 1100 may provide information related to a recommended photographing composition. For example, the output interface 1100 may display a graphic indicator for guiding the recommended photographing composition.

The output interface 1100 may provide information related to a plurality of recommended photographing compositions. For example, the output interface 1100 may display thumbnail images respectively corresponding to the plurality of recommended photographing compositions and may provide preview images respectively corresponding to the plurality of recommended photographing compositions on different pages.

The output interface 1100 may provide information at least one of a recommendation photographing area, a recommendation photographing angle, a recommended pose, and a recommendation face composition.

The sensor 1200 may include at least one from among, but not limited to, a terrestrial magnetism sensor 1211, an acceleration sensor 1212, a tilt sensor 1213, an infrared sensor 1214, a gyroscope sensor 1215, a position sensor (e.g., a GPS) 1216, a temperature/humidity sensor 1217, a proximity sensor 1218, and a light sensor 1219. Functions of the sensors may be intuitively derived by one of ordinary skill in the art from their names, and thus a detailed explanation thereof will not be given.

The sensor 1200 may obtain surrounding environment information (e.g., information related to light in surroundings of the subject) of the subject. For example, the light sensor 1219 (or an illuminance sensor) may obtain an illuminance value of the surroundings of the subject. Also, the light sensor 1219 (or the illuminance sensor) may determine whether the surroundings of the subject are currently in daytime or nighttime. The temperature/humidity sensor 1217 may obtain temperature information of the surroundings of the subject and humidity information of the surroundings of the subject.

The processor 1300 generally controls an overall operation of the electronic apparatus 1000. For example, the processor 1300 may control operations of the output interface 1100, the sensor 1200, the communication interface 1400, the A/V input interface 1500, the user input interface 1600, and the memory 1700 by executing programs stored in the memory 1700.

According to an embodiment, the processor 1300 may include, but is not limited to, an AI processor for generating a learning network model. According to an embodiment, the AI processor may be implemented as a chip separate from the processor 1300.

The processor 1300 may identify the subject included in the preview image and may determine a recommended photographing composition by using information of the identified subject and the surrounding environment information of the subject. The processor 1300 may provide information related to the recommended photographing composition through the output interface 1100.

According to an embodiment, the processor 1300 may determine a current photographing composition from the preview image. When a similarity between the recommended photographing composition and the current photographing composition is less than a threshold value, the processor 1300 may provide the information about the recommended photographing composition. When the similarity between the recommended photographing composition and the current photographing composition is less than the threshold value, the processor 1300 may not provide the information about the recommended photographing composition.

The processor 1300 may obtain a first image having a viewing angle greater than that of the preview image by using a second camera 1512 different from the first camera 1511. The processor 1300 may obtain the surrounding environment information of the subject by analyzing the obtained first image. The processor 1300 may control the output interface 1100 to display information for guiding the recommended photographing composition on the first image.

The processor 1300 may determine a plurality of recommended photographing compositions by using the information of the identified subject and the surrounding environment information of the subject. The processor 1300 may control the output interface 1100 to display thumbnail images respectively corresponding to the plurality of recommended photographing compositions.

The processor 1300 may recommend or automatically apply a photographing setting value based on the information of the identified subject and the surrounding environment information of the subject. The processor 1300 may determine a recommended pose of the subject by using the information of the identified subject and the surrounding environment information of the subject. The processor 1300 may provide information about the recommended pose.

The communication interface 1400 may include one or more elements that enable communication between the electronic apparatus 1000 and a wearable device or between the electronic apparatus 1000 and the server 2000. For example, the communication interface 1400 may include a short-range communication interface 1411, a mobile communication interface 1412, and a broadcast receiver 1413.

Examples of the short-range communication interface 1411 may include, but are not limited to, a Bluetooth communication interface, a Bluetooth low energy (BLE) communication interface, a near-field communication interface, a WLAN (Wi-Fi) communication interface, a Zigbee communication interface, an infrared data association (IrDA) communication interface, a Wi-Fi Direct (WFD) communication interface, an ultra-wideband (UWB) communication interface, and an Ant+ communication interface.

The mobile communication interface 1412 transmits/receives a wireless signal to/from at least one of a base station, an external terminal, and the server 2000 via a mobile communication network. Examples of the wireless signal may include a voice call signal, a video call signal, and any of various pieces of data according to text/multimedia message transmission/reception.

The broadcast receiver 1413 receives a broadcast signal and/or broadcast-related information from the outside through a broadcast channel. Examples of the broadcast channel may include a satellite channel and a terrestrial channel. According to an embodiment, the electronic apparatus 1000 may not include the broadcast receiver 1413.

According to an embodiment, the communication interface 1400 may transmit information about the preview image and the surrounding environment information of the subject to the server 2000 connected to the electronic apparatus 1000. The communication interface 1400 may receive, from the server 2000, information about a recommended photographing composition determined by using the information about the preview image and the surrounding environment information of the subject. The communication interface 1400 may upload a photograph image to an SNS server or may download a photograph image from the SNS server.

The A/V input interface 1500 for receiving an audio signal input or a video signal input may include the first camera 1511, the second camera 1512, and a microphone 1513. The first camera 1511 and the second camera 1512 may obtain image frames such as a still image or a moving image by using an image sensor in a video call mode or a photographing mode. An image captured by the image sensor may be processed by the processor 1300 or an additional image processor (not shown).

The image frames processed by the first camera 1511 or the second camera 1512 may be stored in the memory 1700 or may be transmitted to the outside through the communication interface 1400.

According to an embodiment, the first camera 1511 may be a general camera, and the second camera 1512 may be at least one of, but not limited to, a telephoto camera, a wide-angle camera, and a general camera. The first camera 1511 may correspond to the first camera 1001 of FIG. 10, and the second camera 1512 may correspond to the second camera 1002 of FIG. 10.

The microphone 1513 receives an external sound signal and processes the external sound signal into electrical voice data. For example, the microphone 1513 may receive a sound signal from an external device or a user. The microphone 1513 may use any of various noise removing algorithms to remove noise occurring when receiving the external sound signal.

The user input interface 1600 is a unit through which the user inputs data for controlling the electronic apparatus 1000. Examples of the user input interface 1600 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jug switch.

The memory 1700 may store a program for processing and controlling the processor 1300, and may store input/output data (e.g., the preview image, a photograph image 1712, metadata, the surrounding environment information, personalized learning data, and a recommended pose card).

The memory 1700 may include at least one type of storage medium from among a flash memory type memory, a hard disk type memory, a multimedia card micro type memory, a card-type memory (e.g., a secure digital (SD) memory or an extreme digital (XD) memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1700 may be classified into a plurality of modules according to functions of the memory 1700, for example, a recommendation model 1711. The recommendation model 1711 corresponds to the recommendation model 300 of FIG. 3, and thus a detailed explanation thereof will not be given. A process of generating the recommendation model 1711 will now be described with reference to FIGS. 29 through 32.

Figure 29:
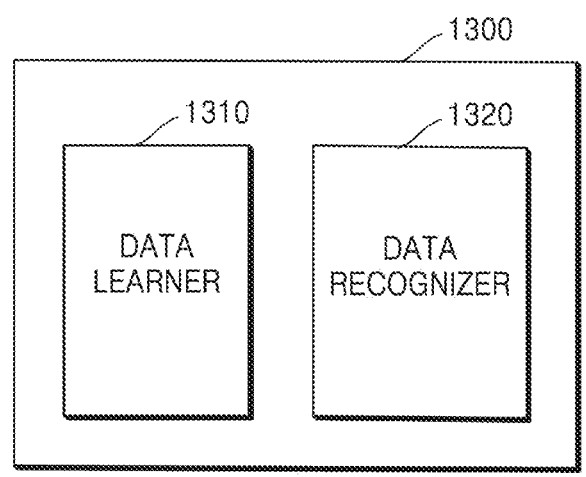
FIG. 29 is a block diagram of a processor according to an embodiment of the disclosure.

FIG. 29 is a block diagram of the processor 1300 according to an embodiment of the disclosure.

Referring to FIG. 29, the processor 1300 according to some embodiments may include a data learner 1310 and a data recognizer 1320.

The data learner 1310 may learn a standard for determining a recommendation situation (e.g., recommendation of a photographing composition, recommendation of a photographing area, recommendation of a pose, or recommendation of an optimal face angle). The data learner 1310 may learn a standard about which data is to be used in order to determine a recommendation situation and how to determine the situation by using the data. The data learner 1310 may learn the standard for determining a recommendation situation by obtaining data (e.g., an image) to be used for learning (or training) and applying the obtained data to a data recognition model.

According to an embodiment, the data learner 1310 may learn a composition where a subject (e.g., a person, an animal, a natural object, or a natural phenomenon) is photographed in a specific environment (e.g., indoors or outdoors, a general illuminance or a low illuminance, daytime or nighttime, a sunset or a sunrise, winter or summer, surroundings of a specific building, or surroundings of a specific natural object). According to an embodiment, the data learner 1310 may learn a photographing composition according to information of the subject (e.g., a type of the subject, the number of subjects, a gender, and an age) or surrounding environment information of the subject (e.g., the amount of light, a direction of light, an intensity of light, whether a location is indoors or outdoors, and whether it is surroundings of a specific building). For example, the data learner 1310 may learn a composition of photographing a person, a composition of photographing an animal, a composition of photographing a mountain, a composition of photographing a sea, a composition of photographing a person indoors, a composition of photographing a person outdoors, a composition of photographing a specific building outdoors, a composition of photographing a food indoors, a composition of photographing several people, a composition of photographing one person, a composition of photographing in nighttime, and a composition of photographing in daytime.

According to an embodiment, the data learner 1310 may learn personalized data. For example, the data learner 1310 may learn data about photographing compositions of deleted photographs, data about photographing compositions of photographs uploaded to an SNS server, data about photographing compositions of photographs transmitted to devices of friends, and data about a photographing composition of a photograph designated as a profile image.

According to an embodiment, the data learner 1310 may learn a standard for recommending a photographing area. According to an embodiment, when the subject is a person, the data learner 1310 may learn a standard for recommending a pose. The data learner 1310 may learn a face composition.

According to an embodiment, the data learner 1310 may learn a standard for recommending a photographing setting value. For example, the data learner 1310 may learn photographing setting values obtained from photographs taken by professionals.

The data recognizer 1320 may determine a recommendation situation based on data. The data recognizer 1320 may recognize the recommendation situation from detected data by using the trained data recognition model. The data recognizer 1320 may obtain image data (e.g., a preview image) according to a standard preset by learning and may determine the recommendation situation based on the image data by using the data recognition model by using the obtained image data as an input value. Also, a resultant value output by the data recognition model by using the obtained image data as an input value may be used to refine the data recognition model.

At least one of the data learner 1310 and the data recognizer 1320 may be manufactured as at least one hardware chip and may be mounted on the electronic apparatus 1000. For example, at least one of the data learner 1310 and the data recognizer 1320 may be manufactured as a dedicated hardware chip for AI, or may be manufactured as a part of an existing general-purpose processor (e.g., a central processing unit (CPU) or an application processor) or a graphics processor (e.g., a graphics processing unit (GPU)) and may be mounted on the electronic apparatus 1000.

In this case, the data learner 1310 and the data recognizer 1320 may be mounted on one electronic apparatus 1000, or may be separately mounted on electronic apparatuses. For example, one of the data learner 1310 and the data recognizer 1320 may be included in the electronic apparatus 1000, and the remaining one may be included in the server 2000. Also, model information established by the data learner 1310 may be provided to the data recognizer 1320 and data input to the data recognizer 1320 may be provided as additional learning data to the data learner 1310 by wire or wirelessly.

At least one of the data learner 1310 and the data recognizer 1320 may be implemented as a software module. When at least one of the data learner 1310 and the data recognizer 1320 is implemented as a software module (or a program module including instructions), the software module may be stored in a non-transitory computer-readable recording medium. Also, in this case, at least one software module may be provided by an operating system (OS) or a predetermined application. Alternatively, a part of at least one software module may be provided by an OS, and the remaining part may be provided by a predetermined application.

Figure 30:
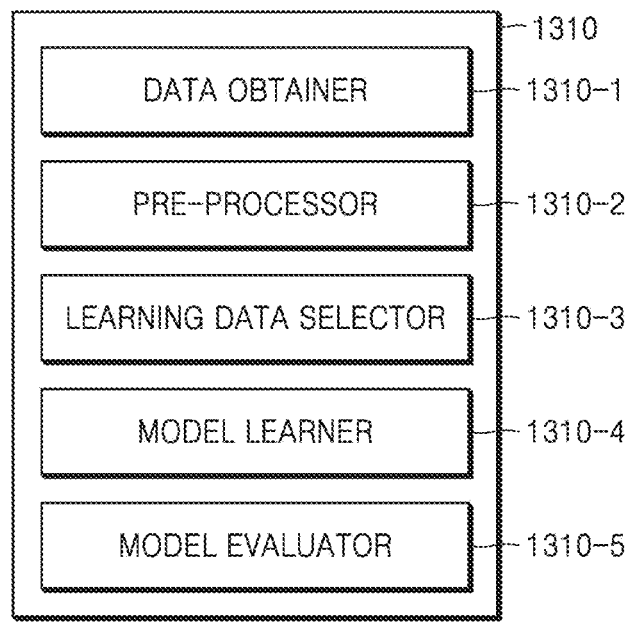
FIG. 30 is a block diagram of a data learner according to an embodiment of the disclosure.

FIG. 30 is a block diagram of the data learner 1310 according to an embodiment of the disclosure.

Referring to FIG. 30, the data learner 1310 (e.g., model evaluator) according to an embodiment may include a data obtainer 1310-1, a pre-processor 1310-2, a learning data selector 1310-3, a model learner 1310-4, and a model evaluator 1310-5.

The data obtainer 1310-1 may obtain data needed to determine a recommendation situation. The data obtainer 1310-1 may obtain data (e.g., a photograph image) needed for learning to determine the recommendation situation. According to an embodiment, the model learner 1310-4 may directly generate data needed to determine the recommendation situation, or may receive data needed to determine the recommendation situation from an external device or a server.

According to an embodiment, the data needed to determine the recommendation situation may include, but is not limited to, information of a subject, surrounding environment information of the subject, and personalized learning data.

According to an embodiment, the data obtainer 1310-1 may obtain image data, voice data, text data, or bio-signal data. For example, the data obtainer 1310-1 may receive data through an input device (e.g., a microphone, a camera, or a sensor) of the electronic apparatus 1000. Alternatively, the data obtainer 1310-1 may obtain data through an external device that communicates with the electronic apparatus 1000.

The pre-processor 1310-2 may pre-process the obtained data so that the obtained data is used for learning for determining the recommendation situation. The pre-processor 1310-2 may process the obtained data into a preset format so that the model learner 1310-4 that will be described below may use the obtained data for learning for determining the recommendation situation.

For example, the pre-processor 1310-2 may generate one synthesized image by overlapping at least some parts of a plurality of images based on a common area included in a plurality of images (or frames) constituting at least a part of an input video. In this case, a plurality of synthesized images may be generated from one video. The common area may be an area including the same or similar common object (e.g., a solid object, an animal/plant, or a person) in the plurality of images. Alternatively, the common area may be an area where colors, shades, RGB values, or CMYK values are the same or similar in the plurality of images.

The learning data selector 1310-3 may select data needed for learning from among pieces of pre-processed data. The selected data may be provided to the model learner 1310-4. The learning data selector 1310-3 may select the data needed for learning from among the pieces of pre-processed data, according to a preset standard for determining the recommendation situation. Also, the learning data selector 1310-3 may select data according to a standard preset by learning by the model learner 1310-4 that will be described below. For example, the learning data selector 1310-3 may select image data including a photographing composition related to the information of the subject and the surrounding environment information of the subject.

The model learner 1310-4 may learn a standard about how to determine the recommendation situation based on learning data. Also, the model learner 1310-4 may learn a standard about which learning data is to be used in order to determine the recommendation situation.

Also, the model learner 1310-4 may train a data recognition model used to determine the recommendation situation by using the learning data. In this case, the data recognition model may be a model that is pre-established. For example, the data recognition model may be a model that is pre-established by receiving basic learning data (e.g., sample data).

The data recognition model may be established in consideration of a field to which a recognition model is applied, the purpose of learning, or the computer performance of the electronic apparatus 1000. The data recognition model may be a model based on, for example, a neural network. For example, a model such as a deep neural network (DNN), a recurrent neural network (RNN), or a bidirectional recurrent deep neural network (BRDNN) may be used as the data recognition model.

According to various embodiments, when a plurality of data recognition models that are pre-established exist, the model learner 1310-4 may determine a data recognition model having a high relationship between input learning data and basic learning data as the data recognition model to be trained. In this case, the basic learning data may be pre-classified according to types of data, and the data recognition model may be pre-established according to the types of data. For example, the basic learning data may be pre-classified according to various standards such as an area where the learning data is generated, a time for which the learning data is generated, a size of the learning data, a genre of the learning data, a generator of the learning data, and a type of the subject in the learning data.

Also, the model learner 1310-4 may train the data recognition model by using a learning algorithm including, for example, error back-propagation or gradient descent.

Also, the model learner 1310-4 may train the data recognition model through supervised learning by using, for example, the learning data as an input value. Also, the model learner 1310-4 may train the data recognition model through unsupervised learning to find a standard for determining a situation by learning a type of data needed to determine the situation by itself without supervision. Also, the model learner 1310-4 may train the data recognition model through reinforcement learning using a feedback about whether a result of determining the situation according to learning is right.

Also, when the data recognition model is trained, the model learner 1310-4 may store the trained data recognition model. In this case, the model learner 1310-4 may store the trained data recognition model in the memory 1700 of the electronic apparatus 1000 including the data recognizer 1320. Alternatively, the model learner 1310-4 may store the trained data recognition model in the memory 1700 of the electronic apparatus 1000 including the data recognizer 1320. Alternatively, the model learner 1310-4 may store the trained data recognition model in a memory of the server 2000 connected to the electronic apparatus 1000 through a wired or wireless network.

In this case, the memory in which the trained data recognition model is stored may also store, for example, a command or data related to at least another element of the electronic apparatus 1000. Also, the memory may store software and/or a program. The program may include, for example, a kernel, middleware, an application programming interface (API), and/or an application program (or an "application").

When the model evaluator 1310-5 inputs evaluation data to the data recognition model and a recognition result output from the evaluation data does not satisfy a predetermined standard, the model evaluator 1310-5 may cause the model learner 1310-4 to learn again. In this case, the evaluation data may be preset data for evaluating the data recognition model.

For example, from among recognition results of the trained data recognition model output from evaluation data, when the number or a ratio of recognition results that are not accurate exceeds a preset threshold value, it may be evaluated that the predetermined standard is not satisfied. For example, when 2% is defined as the predetermined standard and wrong recognition results are output from more than 20 pieces of evaluation data from among 1000 pieces of evaluation data, the model evaluator 1310-5 may evaluate that the trained data recognition model is not suitable.

When a plurality of trained data recognition models exist, the model evaluator 1310-5 may evaluate whether each of the trained recognition models satisfies a predetermined standard, and may determine a model satisfying the predetermined standard as a final data recognition model. In this case, when a plurality of models satisfy the predetermined standard, the model evaluator 1310-5 may determine one or a predetermined number of models that are preset in a descending order of evaluation scores as final data recognition models.

At least one of the data obtainer 1310-1, the pre-processor 1310-2, the learning data selector 1310-3, the model learner 1310-4, and the model evaluator 1310-5 in the data learner 1310 may be manufactured as at least one hardware chip and may be mounted on the electronic apparatus 1000. For example, at least one of the model learner 1310-4, the pre-processor 1310-2, the learning data selector 1310-3, the model learner 1310-4, and the model evaluator 1310-5 may be manufactured as a dedicated hardware chip for AI, or may be manufactured as a part of an existing general-purpose processor (e.g., a CPU or an application processor) or a graphics processor (e.g., a GPU) and may be mounted on the electronic apparatus 1000.

Also, the data obtainer 1310-1, the pre-processor 1310-2, the learning data selector 1310-3, the model learner 1310-4, and the model evaluator 1310-5 may be mounted on one electronic apparatus 1000, or may be separately respectively mounted on electronic apparatuses. For example, some of the data obtainer 1310-1, the pre-processor 1310-2, the learning data selector 1310-3, the model learner 1310-4, and the model evaluator 1310-5 may be included in the electronic apparatus 1000, and the remaining ones may be included in the server 2000.

Also, at least one of the data obtainer 1310-1, the pre-processor 1310-2, the learning data selector 1310-3, the model learner 1310-4, and the model evaluator 1310-5 may be implemented as a software module. When at least one of the data obtainer 1310-1, the pre-processor 1310-2, the learning data selector 1310-3, the model learner 1310-4, and the model evaluator 1310-5 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS, and the remaining part may be provided by a predetermined application.

Figure 31:
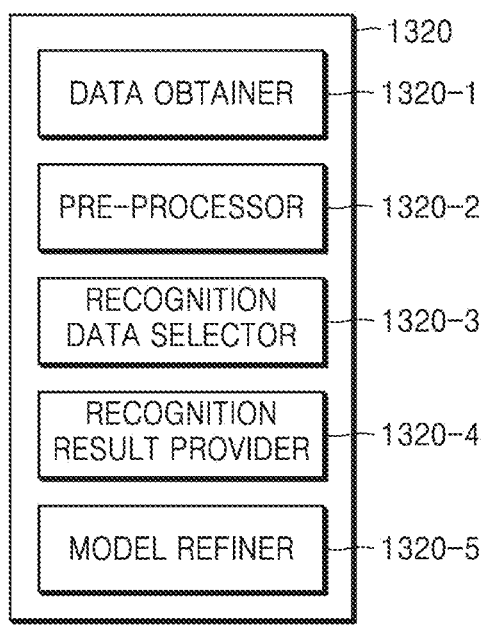
FIG. 31 is a block diagram of a data recognizer according to an embodiment.

FIG. 31 is a block diagram of the data recognizer 1320 according to an embodiment of the disclosure.

Referring to FIG. 31, the data recognizer 1320 according to an embodiment may include a data obtainer 1320-1, a pre-processor 1320-2, a recognition data selector 1320-3, a recognition result provider 1320-4, and a model refiner 1320-5.

The data obtainer 1320-1 may obtain data needed to determine a recommendation situation, and the pre-processor 1320-2 may pre-process the obtained data so that the data obtained to determine a situation is used. The pre-processor 1320-2 may process the obtained data into a preset format so that the recognition result provider 1320-4 that will be described below may use the data obtained to determine the recommendation situation.

The recognition data selector 1320-3 may select data needed to determine the recommendation situation from among pieces of pre-processed data. The selected data may be provided to the recognition result provider 1320-4. The recognition data selector 1320-3 may select some or all of the pieces of pre-processed data according to a preset standard for determining the recommendation situation. Also, the recognition data selector 1320-3 may select data according to a standard preset by learning by the model learner 1310-4 as described below.

The recognition result provider 1320-4 may determine the situation by applying the selected data to a data recognition model. The recognition result provider 1320-4 may provide a recognition result according to recognition purpose of the data. The recognition result provider 1320-4 may apply the selected data to the data recognition model by using the data selected by the recognition data selector 1320-3 as an input value. Also, the recognition result may be determined by the data recognition model.

For example, a recognition result of at least one image may be provided as text, a voice, a video, an image, or instructions (e.g., application execution instructions or module function execution instructions). For example, the recognition result provider 1320-4 may provide a recognition result of an object included in the at least one image. The recognition result may include, for example, pose information of the object included in the at least one image, surrounding state information of the object, and motion change information of the object included in a video.

The model refiner 1320-5 may refine the data recognition model based on evaluation of the recognition result provided by the recognition result provider 1320-4. For example, the model refiner 1320-5 may provide the recognition result provided by the recognition result provider 1320-4 to the model learner 1310-4 so that the model learner 1340-4 refines the data recognition model.

At least one of the data obtainer 1320-1, the pre-processor 1320-2, the recognition data selector 1320-3, the recognition result provider 1320-4, and the model refiner 1320-5 in the data recognizer 1320 may be manufactured as at least one hardware chip and may be mounted on the electronic apparatus 1000. For example, at least one of the data obtainer 1320-1, the pre-processor 1320-2, the recognition data selector 1320-3, the recognition result provider 1320-4, and the model refiner 1320-5 may be manufactured as a dedicated hardware chip for AI, or may be manufactured as a part of an existing general-purpose processor (e.g., a CPU or an application processor) or a graphics processor (e.g., a GPU) and may be mounted on the electronic apparatus 1000.

Also, the data obtainer 1320-1, the pre-processor 1320-2, the recognition data selector 1320-3, the recognition result provider 1320-4, and the model refiner 1320-5 may be mounted on one electronic apparatus 1000, or may be separately respectively mounted on electronic apparatuses. For example, some of the data obtainer 1320-1, the pre-processor 1320-2, the recognition data selector 1320-3, the recognition result provider 1320-4, and the model refiner 1320-5 may be included in the electronic apparatus 1000, and the remaining others may be included in the server 2000.

Also, at least one of the data obtainer 1320-1, the pre-processor 1320-2, the recognition data selector 1320-3, the recognition result provider 1320-4, and the model refiner 1320-5 may be implemented as a software module. When at least one of the data obtainer 1320-1, the pre-processor 1320-2, the recognition data selector 1320-3, the recognition result provider 1320-4, and the model refiner 1320-5 is implemented as a software module (or a program module including instructions), the software module may be stored in a non-transitory computer-readable recording medium. Also, in this case, at least one software module may be provided by an OS or a predetermined application. Alternatively, a part of at least one software module may be provided by an OS and the remaining part may be provided by a predetermined application.

Figure 32:
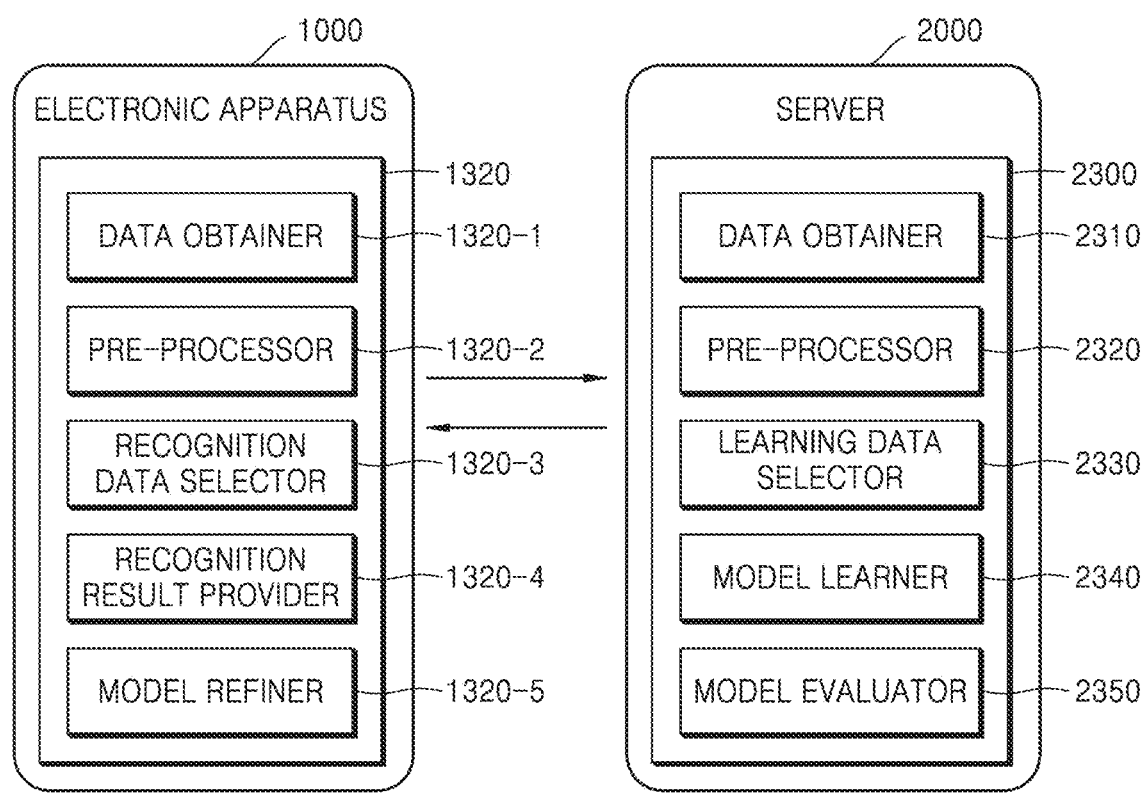
FIG. 32 is a view illustrating an example where the electronic apparatus and the server interoperate to learn and recognize data, according to an embodiment of the disclosure.

FIG. 32 is a block diagram illustrating an example where the electronic apparatus 1000 and the server 2000 interoperate to learn and recognize data according to an embodiment of the disclosure. The server 2000 according to an embodiment may include a data recognizer 2300. The data recognizer 2300 may include a data obtainer 2310, a pre-processor 2320, a learning data selector 2330, a model learner 2340, and a model evaluator 2350.

Referring to FIG. 32, the server 2000 may learn a standard for determining a recommendation situation, and the electronic apparatus 1000 may determine the recommendation situation based on a learning result of the server 2000.

In this case, a model learner 2340 of the server 2000 may perform a function of the data learner 1310 of FIG. 29. The model learner 2340 of the server 2000 may learn a standard about which data is to be used in order to determine the recommendation situation and how to determine the recommendation situation by using the data. The model learner 2340 may obtain data to be used for learning, and may learn a standard for determining a situation by applying the obtained data to a data recognition model that will be described below.

Also, the recognition result provider 1320-4 of the electronic apparatus 1000 may determine the situation by applying data selected by the recognition data selector 1320-3 to the data recognition model generated by the server 2000. For example, the recognition result provider 1320-4 may transmit the data selected by the recognition data selector 1320-3 to the server 2000, and the server 2000 may request to determine the situation by applying the data selected by the recognition data selector 1320-3 to a recognition model. Also, the recognition result provider 1320-4 may receive information about information about the situation determined by the server 2000 from the server 2000.

Alternatively, the recognition result provider 1320-4 of the electronic apparatus 1000 may receive the recognition model generated by the server 2000 from the server 2000, and may determine the recommendation situation by using the received recognition model. In this case, the recognition result provider 1320-4 of the electronic apparatus 1000 may determine the recommendation situation by applying the data selected by the recognition data selector 1320-3 to the data recognition model received from the server 2000.

A method according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that may be executed by a computer by using an interpreter or the like as well as machine language codes made by a compiler.

Some embodiments may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium typically includes computer-readable instructions, data structures, program modules, other data of a modulated data signal, or other transmission mechanisms, and examples thereof include an arbitrary information transmission medium. Also, some embodiments may be implemented as a computer program or a computer program product including computer-executable instructions such as a computer program executed by a computer.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device for obtaining an image, the method comprising:
   obtaining, by a first camera of the electronic device, a first image corresponding to a first photographing area including a subject, wherein the first camera has a first viewing angle;
   obtaining, by a second camera of the electronic device, a second image corresponding to a second photographing area including the subject, wherein the second camera has a second viewing angle greater than the first viewing angle, and wherein the second photographing area includes the first photographing area;
   identifying the subject included in the first image;
   obtaining information regarding the identified subject;
   obtaining information related to light in surroundings of the identified subject;
   determining a recommended photographing composition using an artificial intelligence (AI) model, based on the information of the identified subject and the information related to the light in the surroundings of the subject;
   providing information about the recommended photographing composition;
   based on the obtained first image and the obtained second image, displaying, on a display of the electronic device, a preview image corresponding to at least a portion of the second photographing area including the first photographing area and a first indicator representing the first photographing area;
   while displaying the preview image and the first indicator, receiving a user input to obtain a third image including the subject; and
   in response to receiving the user input, obtaining the third image including the subject.

2. The method of claim 1, wherein the first photographing area is an area to be obtained by the first camera, and the second photographing area is an area to be obtained by the second camera having the second viewing angle greater than the first viewing angle.

3. The method of claim 1, wherein a focal length of the second camera is less than a focal length of the first camera.

4. The method of claim 1, wherein the first image obtained by the first camera and the second image obtained by the second camera are used for determining a composition of the third image in which the subject is included.

5. The method of claim 1, wherein the first photographing area is distinguished from the second photographing area within the preview image.

6. The method of claim 5, wherein the first indicator includes a border between the first photographing area and the second photographing area.

7. The method of claim 1, wherein the first camera and the second camera are placed on a rear side of the electronic device.

8. The method of claim 1, wherein the providing of the information about the recommended photographing composition comprises displaying, on the preview image, information for guiding the recommended photographing composition.

9. An electronic device comprising:
   a first camera;
   a second camera;
   a display;
   a memory storing one or more instructions; and
   at least one processor configured to execute the one or more instructions at least to:
      obtain, by the first camera, a first image corresponding to a first photographing area including a subject, wherein the first camera has a first viewing angle;
      obtain, by the second camera, a second image corresponding to a second photographing area including the subject, wherein the second camera has a second viewing angle greater than the first viewing angle, and wherein the second photographing area includes the first photographing area;
      identify the subject included in the first image;
      obtain information regarding the identified subject;
      obtain information related to light in surroundings of the identified subject;
      determine a recommended photographing composition using an artificial intelligence (AI) model, based on the information of the identified subject and the information related to the light in the surroundings of the subject;
      provide information about the recommended photographing composition;
      based on the obtained first image and the obtained second image, display, on the display, a preview image corresponding to at least a portion of the second photographing area including the first photographing area and a first indicator representing the first photographing area;
      while displaying the preview image and the first indicator, receive a user input to obtain a third image including the subject; and
      in response to receiving the user input, obtain the third image including the subject.

10. The electronic device of claim 9, wherein the first photographing area is an area to be obtained by the first camera, and the second photographing area is an area to be obtained by the second camera having the second viewing angle greater than the first viewing angle.

11. The electronic device of claim 9, wherein a focal length of the second camera is less than a focal length of the first camera.

12. The electronic device of claim 9, wherein the at least one processor further executes the one or more instructions to determine a composition of the third image by using the first image obtained by the first camera and the second image obtained by the second camera.

13. The electronic device of claim 9, wherein the at least one processor further executes the one or more instructions to distinguish the first photographing area from the second photographing area within the preview image.

14. The electronic device of claim 13, wherein the first indicator includes a border between the first photographing area and the second photographing area.

15. The electronic device of claim 9, wherein the first camera and the second camera are placed on a rear side of the electronic device.

16. A computer program product comprising a non-transitory computer readable storage medium having a computer readable program stored therein, wherein the computer readable program, when executed by an electronic device including a first camera and a second camera, causes the electronic device to:

obtain, by the first camera, a first image corresponding to a first photographing area including a subject, wherein the first camera has a first viewing angle;

obtain, by the second camera, a second image corresponding to a second photographing area including the subject, wherein the second camera has a second viewing angle greater than the first viewing angle, and wherein the second photographing area includes the first photographing area;

identify the subject included in the first image;

obtain information regarding the identified subject;

obtain information related to light in surroundings of the identified subject;

determine a recommended photographing composition using an artificial intelligence (AI) model, based on the information of the identified subject and the information related to the light in the surroundings of the subject;

provide information about the recommended photographing composition;

based on the obtained first image and the obtained second image, display, on a display of the electronic device, a preview image corresponding to at least a portion of the second photographing area including the first photographing area and a first indicator representing the first photographing area;

while displaying the preview image and the first indicator, receive a user input to obtain a third image including the subject; and in response to receiving the user input, obtain the third image including the subject.

* * * * *